US011629906B2

United States Patent
Choi et al.

(10) Patent No.: US 11,629,906 B2
(45) Date of Patent: Apr. 18, 2023

(54) REFRIGERATOR AND TRANSPARENT PANEL ASSEMBLY FOR REFRIGERATOR

(71) Applicant: LG Electronics Inc., Seoul (KR)

(72) Inventors: Seungjin Choi, Seoul (KR); Jaehoon Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/704,887

(22) Filed: Mar. 25, 2022

(65) Prior Publication Data

US 2022/0214097 A1 Jul. 7, 2022

Related U.S. Application Data

(63) Continuation of application No. 15/930,827, filed on May 13, 2020, now Pat. No. 11,300,353, which is a
(Continued)

(30) Foreign Application Priority Data

Jan. 23, 2017 (KR) .......................... 10-2017-0010323

(51) Int. Cl.
*F25D 23/04* (2006.01)
*A47F 3/04* (2006.01)
(Continued)

(52) U.S. Cl.
CPC ............ *F25D 23/04* (2013.01); *A47F 3/0434* (2013.01); *F25D 23/028* (2013.01); *F25D 27/00* (2013.01);
(Continued)

(58) Field of Classification Search
CPC ...... A47F 3/0434; F25D 23/028; F25D 27/00; F25D 2323/021; F25D 2323/023
See application file for complete search history.

(56) References Cited

U.S. PATENT DOCUMENTS 5,983,593 A * 11/1999 Carbary ................ E06B 3/6715
52/204.593
8,024,907 B2 * 9/2011 McKinlay ................. E06B 3/56
52/204.593
(Continued)

FOREIGN PATENT DOCUMENTS

CN 1875154 12/2006
CN 202141276 2/2012
(Continued)

OTHER PUBLICATIONS

Chinese Office Action in Chinese Appln. No. 201880008093.9, dated Jul. 23, 2020, 15 pages (with English translation).
(Continued)

*Primary Examiner* — Daniel J Rohrhoff
(74) *Attorney, Agent, or Firm* — Fish & Richardson P.C.

(57) ABSTRACT

The present disclosure relates to a refrigerator and a transparent panel assembly for a refrigerator. The transparent panel assembly for a refrigerator comprises: a front panel defining at least a part of a front appearance of a refrigerator door and made of a glass material; a rear panel defining at least a part of a rear appearance of the refrigerator door and made of a transparent material; and an intermediate member connected between the front panel and the rear panel and made of a transparent plastic member, wherein the intermediate member comprises: an edge portion having both ends connected to a screening area formed at peripheries of the front panel and the rear panel; and a partition portion formed to cross an inner surface of the edge portion to partition a gap between the front panel and the rear panel to thereby form a sealed insulation layer.

20 Claims, 16 Drawing Sheets

Related U.S. Application Data continuation of application No. 16/480,263, filed as application No. PCT/KR2018/000806 on Jan. 17, 2018, now Pat. No. 10,677,515.

(51) Int. Cl.
*F25D 27/00* (2006.01)
*F25D 23/02* (2006.01)

(52) U.S. Cl.
CPC .. *F25D 2323/021* (2013.01); *F25D 2323/023* (2013.01)

(56) References Cited

U.S. PATENT DOCUMENTS

| | | | | |
|---|---|---|---|---|
| 8,572,929 | B2* | 11/2013 | Stumm | E06B 1/325 |
| | | | | 52/794.1 |
| 10,667,515 | B2* | 6/2020 | Martin | C07D 401/04 |
| 10,677,515 | B2 | 6/2020 | Choi et al. | |
| 11,300,353 | B2* | 4/2022 | Choi | F25D 21/04 |
| 2005/0202178 | A1 | 9/2005 | Roche et al. | |
| 2018/0112909 | A1* | 4/2018 | Choi | B29C 44/588 |
| 2019/0249485 | A1* | 8/2019 | Jeong | F21V 33/0044 |
| 2019/0271500 | A1* | 9/2019 | Lee | F25D 23/028 |
| 2019/0360745 | A1* | 11/2019 | Lee | F21V 33/0044 |

FOREIGN PATENT DOCUMENTS

| | | |
|---|---|---|
| KR | 20000034754 | 6/2000 |
| KR | 200247017 | 9/2001 |
| KR | 20060058125 | 5/2006 |
| KR | 101197705 | 10/2012 |
| KR | 20130066309 | 6/2013 |
| WO | WO2008014269 | 1/2008 |
| WO | WO2017010828 | 1/2017 |

OTHER PUBLICATIONS

Extended European Search Report in European Appln. No. 18741110.3, dated Sep. 11, 2020, 10 pages.
International Search Report in International Appln. No. PCT/KR2018/000806, dated May 30, 2018, 4 pages (with English translation).
Office Action in Chinese Appln. No. 201880008093.9 dated Jul. 23, 2020, 15 pages (with English translation).

* cited by examiner

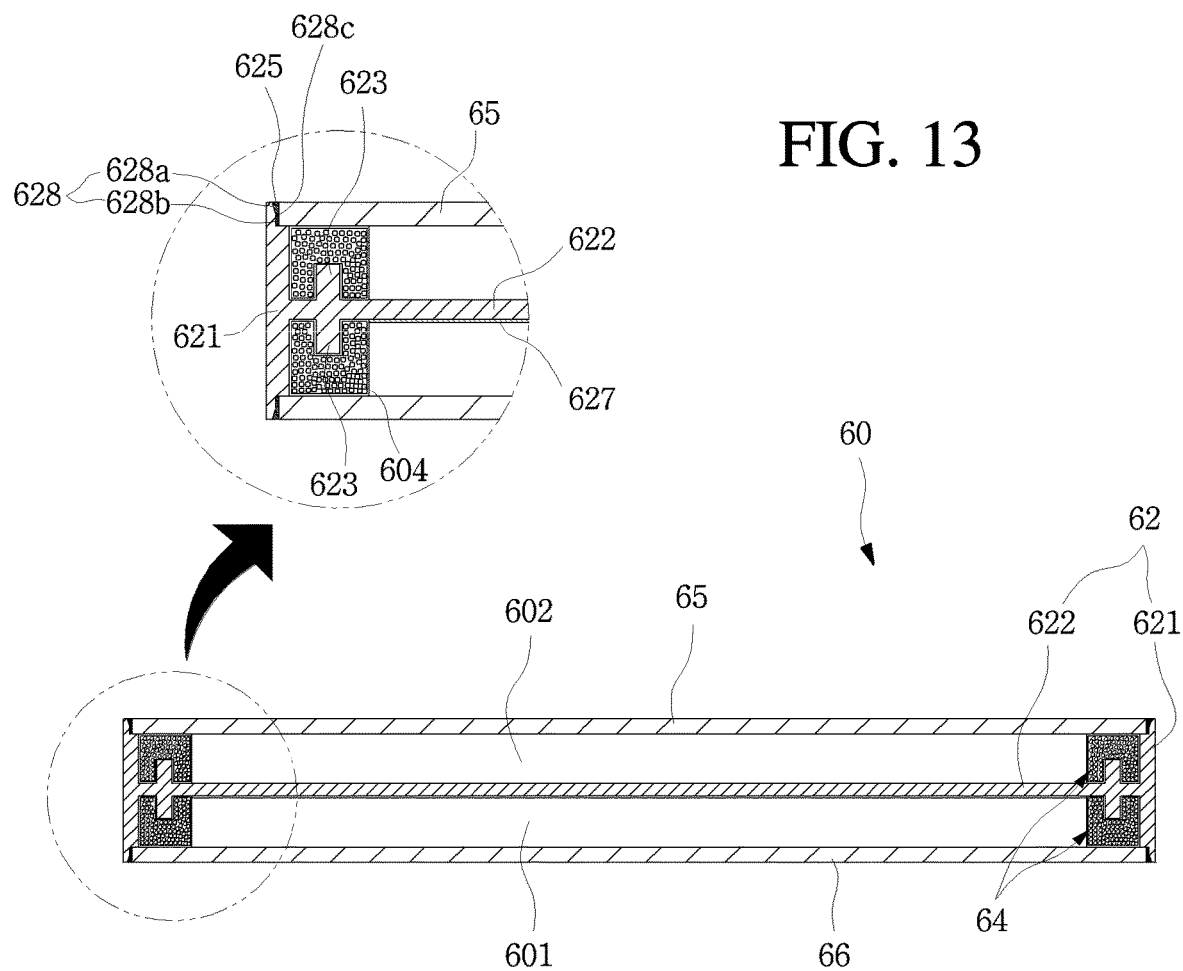
FIG. 13
FIG. 14
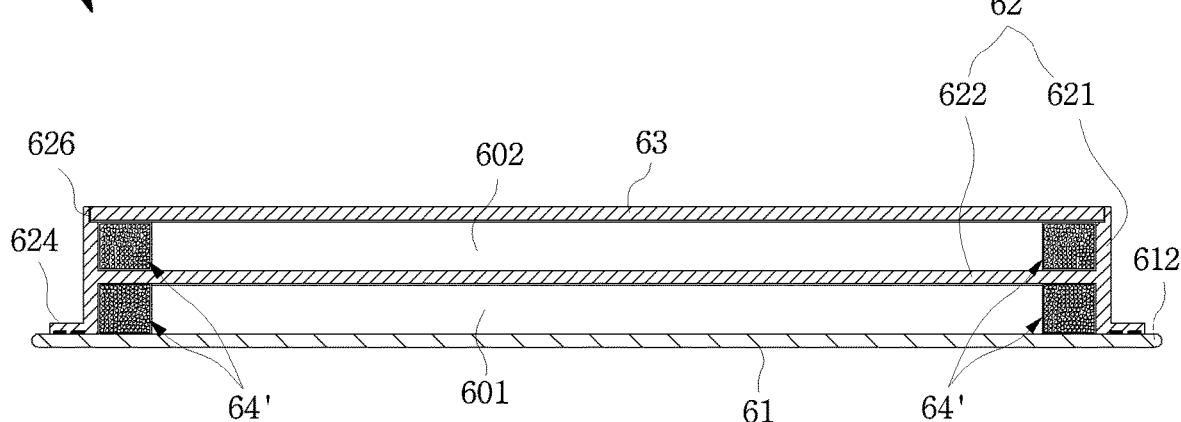

REFRIGERATOR AND TRANSPARENT PANEL ASSEMBLY FOR REFRIGERATOR

CROSS-REFERENCE TO RELATED APPLICATIONS

This application is a continuation of U.S. application Ser. No. 15/930,827, filed on May 13, 2020, which is a continuation of U.S. application Ser. No. 16/480,263, filed on Jul. 23, 2019, now U.S. Pat. No. 10,677,515, which is a National Stage application under 35 U.S.C. § 371 of International Application No. PCT/KR2018/000806, filed on Jan. 17, 2018, which claims the benefit of Korean Patent Application No. 10-2017-0010323, filed on Jan. 23, 2017. The disclosures of the prior applications are incorporated by reference in their entirety.

TECHNICAL FIELD

The present disclosure relates to a refrigerator and a transparent panel assembly for a refrigerator.

BACKGROUND ART

In general, a refrigerator refers to a home appliance in which food may be stored in an internal storage space, which is shielded by a door, at a low temperature. To achieve this, the refrigerator is configured to accommodate the stored food in an optimum state by cooling the internal storage space using cold air generated through heat exchange with a refrigerant circulating in a refrigeration cycle.

In recent years, refrigerators have become increasingly multi-functional with changes of dietary lives and gentrification of products, and refrigerators having various structures and convenience devices for convenience of users and for efficient use of internal spaces have been released.

The storage space of the refrigerator may be opened and closed by the door. Further, the refrigerator may be classified into various types according to arrangement of the storage space and a structure of the door configured to open and close the storage space.

The door of the refrigerator may be provided with a separate storage space accessible from the outside. It is possible to access the storage space by opening a part of an auxiliary door or a home bar door without opening the entire refrigerator door through such a storage space.

Therefore, foods frequently used can be stored in a separate storage space provided in the refrigerator door. In addition, since the entire refrigerator door is not opened for storing food, there is an advantage that the outflow of cold air in the inside of the refrigerator to the outside can be minimized.

However, such a structure also has a problem that the food inside the refrigerator cannot be confirmed if the refrigerator door is not opened. That is, the door must be opened so as to confirm whether the desired food is stored in the internal space or in a separate storage space provided in the door. If there is no desired food when the auxiliary door or the home bar is opened, there is a disadvantage that the main door must be opened again. At this time, unnecessary leakage of cold air may occur.

To solve such a problem, Korean Patent Application Publication No. 10-2000-0034754 discloses a refrigerator having a transparent window on a refrigerator door, wherein the transparent window has a structure in which a plurality of glasses are arranged in a multi-stage.

However, in such a structure in which a plurality of glasses are arranged in a multi-stage, the weight of the door becomes heavy due to a large number of glasses, which deteriorates operability and lowers structural stability.

Further, there is a problem that the production process is complicated and takes a long time, such as disposing a barrel between a plurality of glasses, joining them, and applying a sealant, resulting in poor productivity.

SUMMARY

Embodiments provide a refrigerator and a transparent panel assembly for a refrigerator, which are capable of reducing manufacturing costs and improving productivity.

Embodiments also provide a transparent multi-layered insulating structure capable of seeing through the inside in a door, and provide a refrigerator and a transparent panel assembly for a refrigerator, which are light in weight.

In one embodiment, a transparent panel assembly for a refrigerator may include: a front panel defining at least a part of a front appearance of a refrigerator door and made of a glass material; a rear panel defining at least a part of a rear appearance of the refrigerator door and made of a transparent material; and an intermediate member connected between the front panel and the rear panel and made of a transparent plastic member, wherein the intermediate member may include: an edge portion having both ends connected to a screening area formed at peripheries of the front panel and the rear panel; and a partition portion formed to cross an inner surface of the edge portion to partition a gap between the front panel and the rear panel to thereby form a sealed insulation layer.

The intermediate member may be injection-molded using polymethyl methacrylate (PMMA).

The rear panel may be injection-molded with the same material as that of the intermediate member.

The rear panel may be made of a glass material.

An insulation coating layer made of a metal material by sputtering may be formed on the surface of the partition portion.

A moisture absorbent case in which a moisture absorbent is accommodated may be provided between the partition portion and the front panel and between the partition portion and the rear panel, and the moisture absorbent may absorb moisture inside the insulation layer, and the moisture absorbent case may be disposed along the edge portion.

A mounting protrusion may be formed in at least a part of a top surface and a bottom surface of the partition portion, and a mounting groove into which the mounting protrusion is inserted to fix and mount the moisture absorbent case may be formed in the moisture absorbent case.

The moisture absorbent case may come into contact with the partition portion and the edge portion, and the front panel and the rear panel to support the front panel and the rear panel.

The front panel may be formed to be larger than the intermediate member and the rear panel, and a front adhesive portion bent outward and attached to the front panel may be formed at a front end of the edge portion.

An adhesive groove recessed to accommodate an adhesive for attachment to the front panel may be formed at the front end of the edge portion, and the adhesive may be a UV adhesive that is cured by ultraviolet light.

A stepped portion on which the periphery of the rear panel may be seated is formed at a rear end of the edge portion, and the stepped portion and the periphery of the rear panel may be vibration-welded by ultrasonic waves in a state of being in contact with each other.

A stepped portion may be formed at a rear end of the edge portion such that the periphery of the rear panel is seated in a state of being spaced apart, and a UV adhesive that is cured by ultraviolet light may be injected into a space in which the stepped portion and the rear panel are spaced apart.

An inner surface of the stepped portion may include an inclined portion in which the space in which the stepped portion and the rear panel are spaced apart is narrowed forward from the opened rear end.

The front panel and the rear panel may be formed in the same size, and stepped portions stepped such that the peripheries of the front panel and the rear panel are respectively seated may be formed at the front end and the rear end of the edge portion.

The partition portion may provided in plurality in a front and rear direction at equal intervals.

The edge portion may define a peripheral surface appearance between the front panel and the rear panel.

In one embodiment, a refrigerator may include: a cabinet in which a storage space is formed; a door opening and closing the storage space; a door light provided in the door to illuminate a rear space of the door; a front panel defining at least a part of a front appearance of the door and made of a glass material; a rear panel defining at least a part of a rear appearance of the door and made of a transparent material; and an intermediate member connected between the front panel and the rear panel and made of a transparent plastic member, wherein the intermediate member includes: an edge portion having both ends connected to a screening area formed at peripheries of the front panel and the rear panel; and a partition portion formed to cross an inner surface of the edge portion to partition a gap between the front panel and the rear panel to thereby form a sealed insulation layer.

The door may include: a main door opening and closing the storage space and having an opening that communicates with a door storage space; and a sub-door rotatably mounted on a front surface of the main door to defining a front appearance of the door, and opening and closing the opening, wherein the transparent panel assembly is mounted on the sub-door to see through the door storage space.

The door may include: a main door opening and closing the storage space and having an opening that communicates with a door storage space; and a sub-door rotatably mounted inside the opening to defining a front appearance of the door, and opening and closing the opening, wherein the transparent panel assembly is mounted on the sub-door to see through the door storage space.

The front panel may be formed to be larger than the intermediate member and the rear panel, and a protruding periphery of the front panel may be seated on the door and fixed and mounted thereto.

The following effects may be expected in the refrigerator and the transparent panel assembly for the refrigerator according to the proposed embodiments.

According to the embodiment of the present disclosure, the intermediate member having a complicated shape of the transparent panel assembly may be injection-molded with the transparent plastic material, thereby improving the processability and productivity and reducing the manufacturing costs.

Further, due to the characteristics of the transparent plastic material, the intermediate member may be cured by using a UV adhesive in a short time and may be attached, thereby remarkably improving the productivity.

In addition, the intermediate member having a complicated structure such as the mounting structure of the moisture absorbent case and the coupling structure of the front panel and the rear panel is injection-molded with the transparent plastic material, thereby facilitating the design and the assembly work.

In addition, since the intermediate member and the rear panel are made of the light plastic material, the weight of the door may be remarkably reduced and lightened, thereby facilitating the design of the door mounting structure and improving the durability.

Since the insulation coating layer is formed by the low temperature deposition method using the metal material in the partition portion of the intermediate member made of the plastic material, the ultraviolet light is blocked in a state in which the surface of the intermediate member is not damaged, thereby enabling the radiant insulation.

The plurality of partitioned insulation layers may be easily formed only by assembling the intermediate member by the partition portion formed in the intermediate member, and the effect of improving the insulation performance by the plurality of insulation layers may be expected.

BRIEF DESCRIPTION OF THE DRAWINGS

FIG. 13 is a cross-sectional view of a transparent panel assembly according to a fourth embodiment of the present disclosure.

FIG. 14 is a cross-sectional view of a transparent panel assembly according to a fifth embodiment of the present disclosure.

DETAILED DESCRIPTION

Hereinafter, detailed embodiments of the present disclosure will be described in detail with reference to the accompanying drawings. However, the scope of the present disclosure is not limited to proposed embodiments, and other regressive inventions or other embodiments included in the scope of the spirits of the present disclosure may be easily proposed through addition, change, deletion, and the like of other elements.

Figure 1:
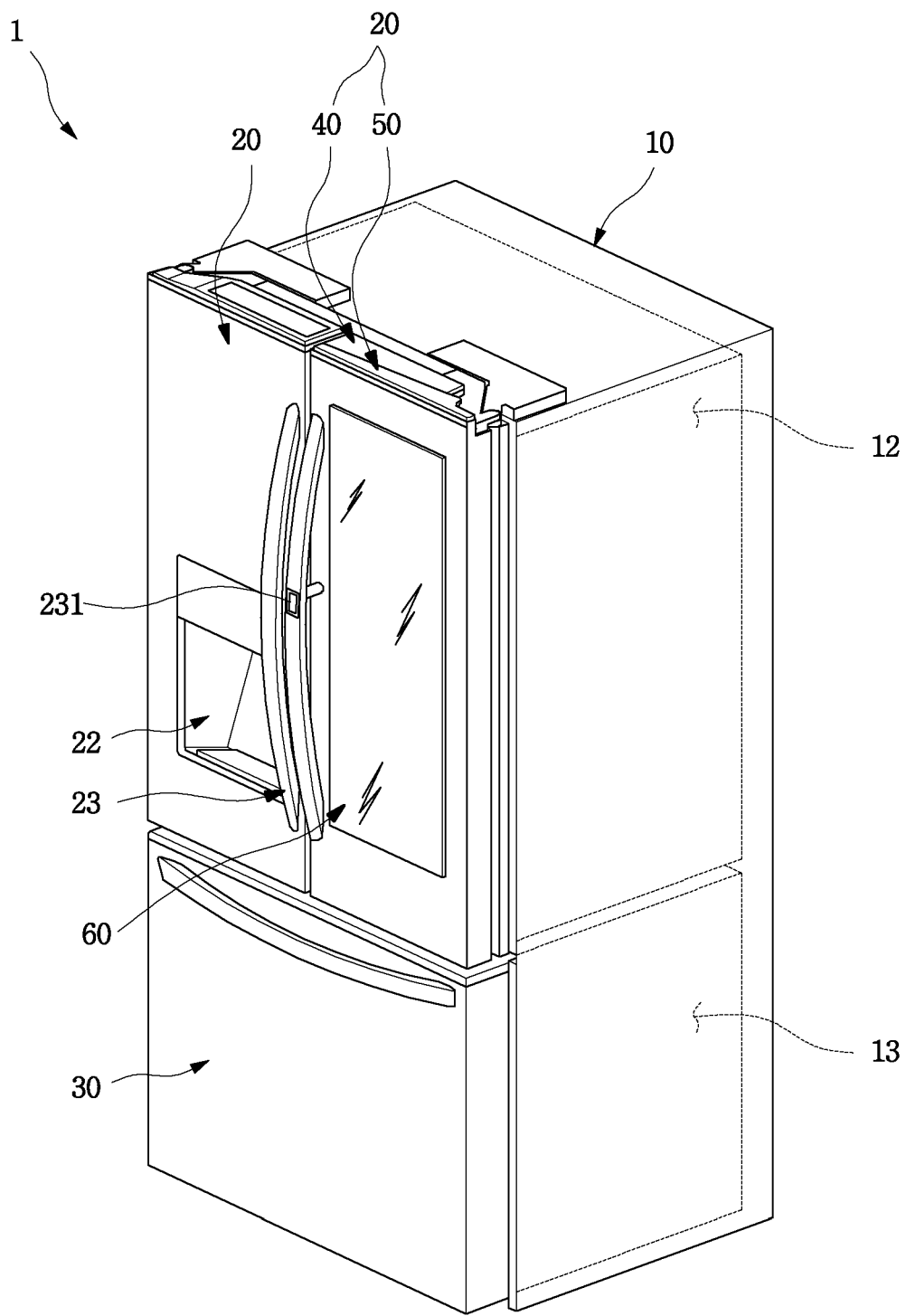
FIG. 1 is a perspective view of a refrigerator according to a first embodiment of the present disclosure.
Figure 2:
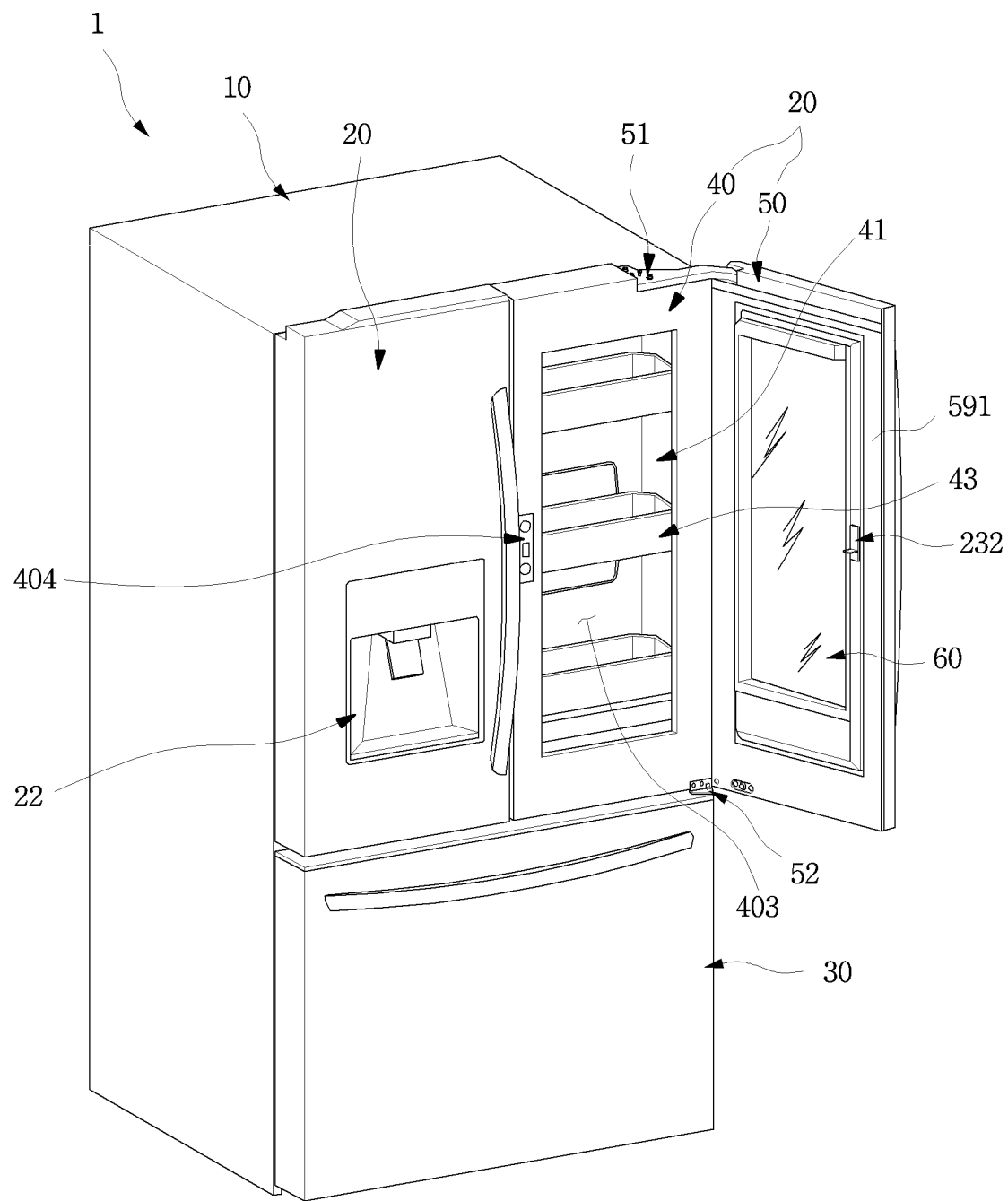
FIG. 2 is a perspective view illustrating a state in which a sub-door of the refrigerator is opened.
Figure 3:
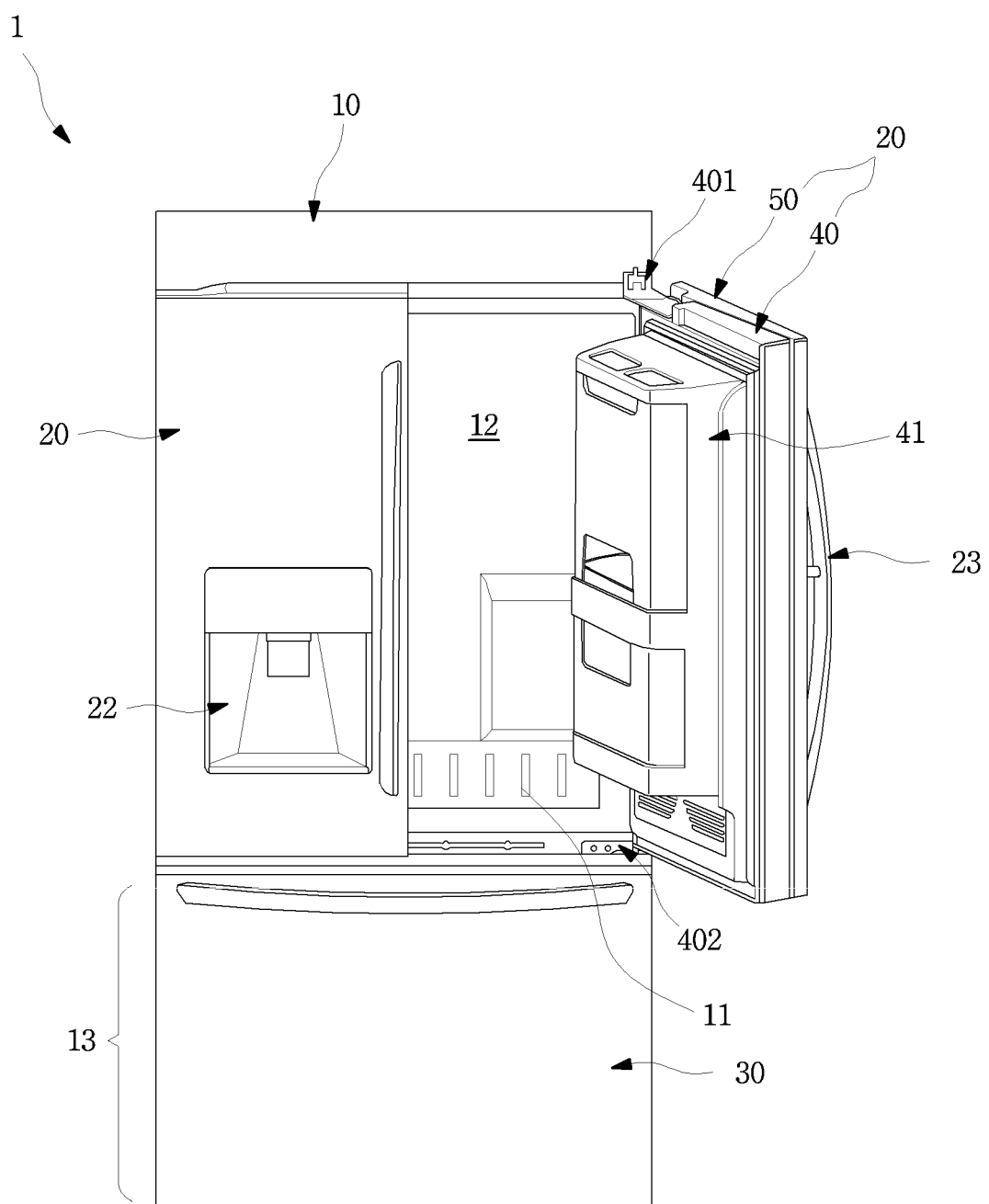
FIG. 3 is a perspective view illustrating a state in which a main door of the refrigerator is opened.

FIG. 1 is a perspective view of a refrigerator according to a first embodiment of the present disclosure. FIG. 2 is a perspective view illustrating a state in which a sub-door of the refrigerator is opened. FIG. 3 is a perspective view illustrating a state in which a main door of the refrigerator is opened.

As illustrated in the drawings, an outer appearance of the refrigerator 1 according to the first embodiment of the present disclosure may be formed by a cabinet 10 defining a storage space and doors configured to open and close the storage space.

An interior of the cabinet 10 may be vertically partitioned by a barrier 11, a refrigerating chamber 12 may be formed above the cabinet 10, and a freezing chamber 13 may be formed below the cabinet 10.

The doors may include refrigerating chamber doors 20 and freezing chamber doors 30. The refrigerating chamber doors 20 may be configured to open and close an opened front surface of the refrigerating chamber 12 through pivoting, and the freezing chamber doors 30 may be configured to open and close an opened front surface of the freezing chamber 13 through pivoting.

Further, the pair of refrigerating chamber doors 20 are provided on left and right sides, and the refrigerating chamber 12 may be shielded by the pair of doors. The freezing chamber doors 30 may be drawable in a drawer form and configured to open and close the freezing chamber 13 by drawing.

Meanwhile, although an example where a French-type door that includes a pair of doors and opens and closes one space by rotating the doors is applied to a bottom freeze-type refrigerator in which a freezing chamber is provided below is illustratively described in the embodiment of the present disclosure, the present disclosure may be applied to all types of refrigerators having doors regardless of types of the refrigerators.

A dispenser 22 may be provided on the front surface of the left refrigerating chamber door 20 among the pair of refrigerating chamber doors 20. The refrigerating chamber door 20 on the right side (when viewed in FIG. 1) among the pair of refrigerating chamber doors 20 may be configured to be doubly opened and closed. In detail, the refrigerating chamber door 20 disposed on the right side may include a main door 40 opening and closing the refrigerating chamber 12, and a sub-door 50 pivotably disposed on the main door 40 to open and close an opening 403 formed in the main door 40, The main door 40 may be formed to have the same size as that of the refrigerating chamber door 20 on the left side (when viewed in FIG. 1) among the pair of refrigerating chamber doors 20. The main door 40 is pivotably mounted on the cabinet 10 by an upper hinge 401 and a lower hinge 402 to open and close at least a part of the refrigerating chamber 12.

The opening 403 that is opened in a predetermined size is formed in the main door 40. A storage case 41 may be provided on the rear surface of the main door 40. A plurality of door baskets 43 may be arranged in the storage case 41 to form a door storage space on the rear surface of the main door. Therefore, the user can access the door basket 43 by opening the sub-door 50. At this time, the size of the opening 403 may occupy most of the front surface of the main door 40 except for a part of the periphery of the main door 40.

The sub-door 50 may include a sub-upper hinge 51 and a sub-lower hinge 52 at the upper and lower ends thereof so as to be pivotally mounted on the front surface of the main door 40. Therefore, the sub-door 50 may be configured to pivot independently in a closed state of the main door 40 to open and close the opening 403.

The size of the sub-door 50 may be the same as the size of the main door 40 to shield the entire front surface of the main door 40. When the sub-door 50 is closed, the main door 40 and the sub-door 50 are coupled to each other and are configured to have the same size and shape as those of the refrigerating chamber door 20 formed on the left side. A sub-gasket 591 may be provided on the rear surface of the sub-door 50 to seal the space between the main door 40 and the sub-door 50.

A handle 23 that opens the refrigerating chamber door 20 may be provided on the front surface of the refrigerating chamber door 20. The handle 23 is provided with an operation button 231, and the sub-door 50 may be provided with a locking unit 232 that is operated by the operation button 231. The locking unit 232 may protrude rearward from the sub-door 50 and may be selectively separated from a restraint member 404 of the main door by the manipulation of the operation button 231.

The main door 40 and the sub-door 50 may be rotated in a coupled state by pulling the handle 23 when the locking unit 232 and the restraint member 404 are coupled to each other, and the refrigerating chamber 12 may be opened. When the handle 23 is pulled in a state where the locking unit 232 and the restraint member 404 are separated by pressing the operation button 231, only the sub-door 50 may be rotated, and the opening 403 of the main door 40 may be opened.

The sub-door 50 is provided with a transparent panel assembly 60 made of a transparent member such as glass at the center thereof. Therefore, even when the sub-door 50 is closed, the interior of the opening 403 may be seen through. The sub-door 50 may be referred to as a see-through door.

The transparent panel assembly 60 is configured to adjust the transmittance and reflectance of light. Therefore, it is possible to selectively change the transparent state or the opaque state by turning on/off the door light 54 provided on the sub-door 50 or the main door 40. Therefore, when the door light 54 is turned on by the user's manipulation, the transparent panel assembly 60 becomes transparent so that the interior of the refrigerator can be visible. When the door light 54 is turned off, the transparent panel assembly 60 may become opaque.

Figure 4:
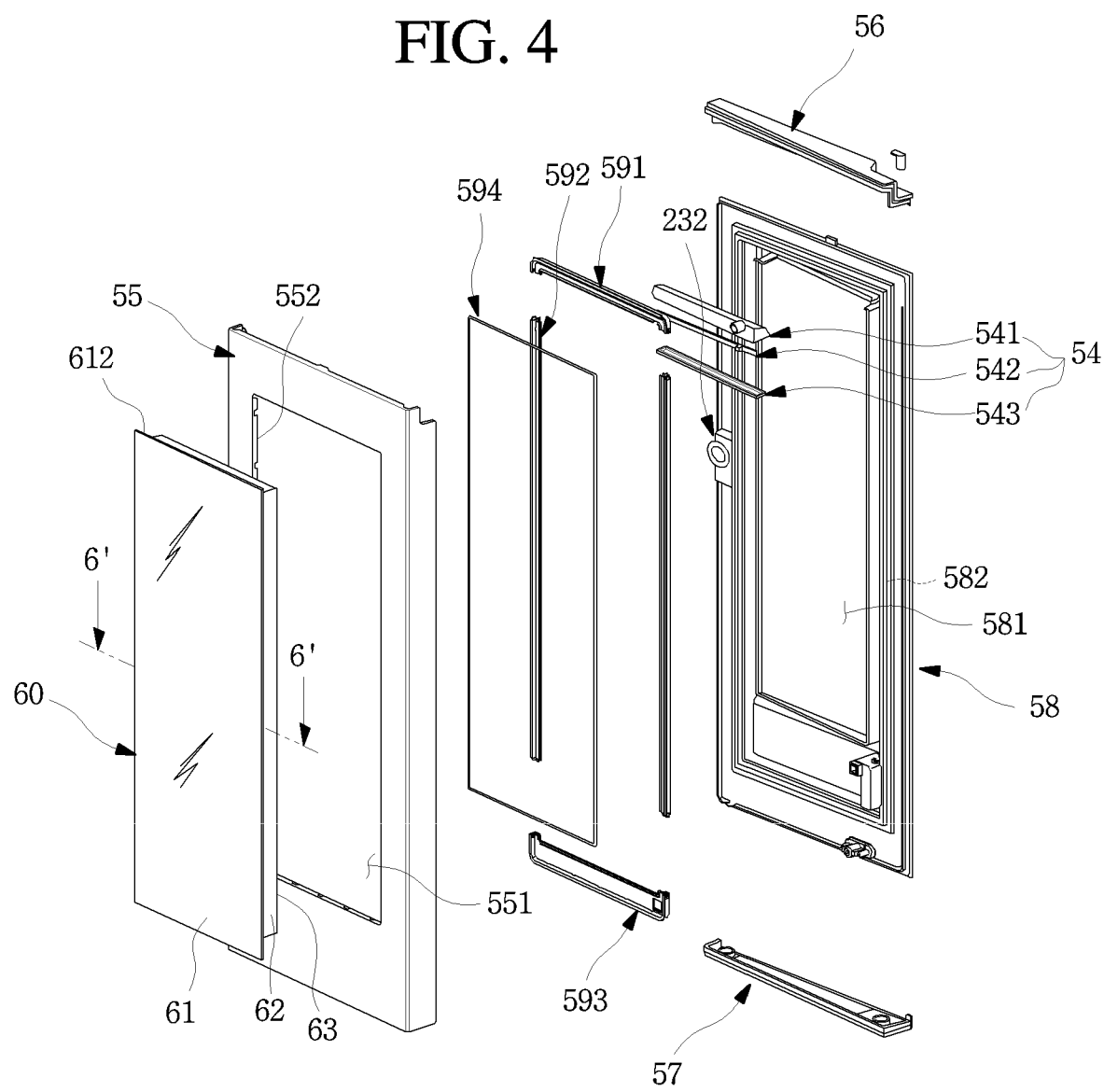
FIG. 4 is an exploded perspective view of the sub-door.

FIG. 4 is an exploded perspective view of the sub-door.

As illustrated in the drawings, the sub-door 50 may include an outer plate 55 forming an outer appearance, a transparent panel assembly 60 mounted on an opening of the outer plate 55, a door liner 58 spaced apart from the outer plate 55, and an upper cap decoration 56 and a lower cap decoration 57 that form the upper and lower surfaces of the sub-door 50.

The outer plate 55 forms a part of the front appearance and the peripheral surface of the sub-door 50 and may be made of stainless steel. A panel mount 551 is formed at the center of the outer plate 55 to form the transparent panel assembly 60. The panel mount 551 may be formed to have the equal or similar size to that of the opening 403 as the space for see through the inside of the opening 403 of the main door 40. A plate bending portion 552 bent perpendicularly inward along the periphery of the panel mount 551 is formed.

The transparent panel assembly 60 is configured to shield the panel mount 551, and the front surface of the transparent panel assembly 60 may be formed on the same plane as the front surface of the outer plate 55 in a state where the transparent panel assembly 60 is mounted.

The door liner 58 forms the rear surface of the sub-door 50, and a liner opening 581 is formed in a region where the transparent panel assembly 60 is disposed. A liner groove 582 for maintaining the shape of the door liner 58 may be formed around the door liner 58 along the liner opening 581. Since the liner groove 582 is recessed at the rear surface of the sub-door 50, a sub-gasket 591 for sealing the space between the sub-door 50 and the main door 40 may be mounted thereon.

Meanwhile, the door light 54 may be mounted on the upper end of the liner opening 581. The door light 54 may illuminate a portion where the plurality of door baskets 43 mounted on the main door 40 are disposed. Since the inside of the transparent panel assembly 60 is made brighter than the outside of the transparent panel assembly 60, the transparent panel assembly 60 may be made transparently visible.

The door light 54 may include a light case 541 mounted on the door liner 58, a light source 542 accommodated in the light case 541, and a light cover 543 that shields the opened bottom surface of the light case 541 to transmit light of the light source. The light source 542 may include a package on which a plurality of LEDs are mounted, and other light emitting devices capable of replacing the LEDs are also possible.

A support frame 59 for fixing the outer plate 55 and the transparent panel assembly 60 along the periphery of the panel mount 551 is provided on the rear surface of the outer plate 55. The support frame 59 may be constituted by a combination of the upper frame 591, the lower frame 593, and a pair of side frames 592. Further, the support frame 59 may be disposed along the periphery of the panel mount 551, may accommodate the plate bending portion 552, and may be attached to the rear surface of the transparent panel assembly 60. A heater 594 disposed on the rear surface of the transparent panel assembly 60 may be fixed.

One side of the support frame 59 may be fixed to the outer plate 55 by inserting the plate bending portion 552, and the other side of the support frame 59 may be attached to the periphery of the panel assembly 54 such that the panel assembly 54 may be fixed on the panel mount 551.

The transparent panel assembly 60 is formed by arranging a plurality of transparent panels, which can be seen through the inside of the transparent panel assembly 60, in a front and rear direction, and may be assembled in a module form and assembled and mounted inside the panel mount.

When the front panel 61 of the transparent panel assembly 60 is formed to correspond to the size of the panel mount 551 and shields the panel mount 551, the periphery of the front panel 61 may protrude outward and may be seated on the support frame 59.

An intermediate panel 62 and a rear panel 63 may be disposed behind the front panel 61. The size of the intermediate member 62 and the rear panel 63 may be smaller than the size of the front panel 61 to form a seating portion 612 in which a peripheral surface of the front panel 61 protrudes outward.

Figure 5:
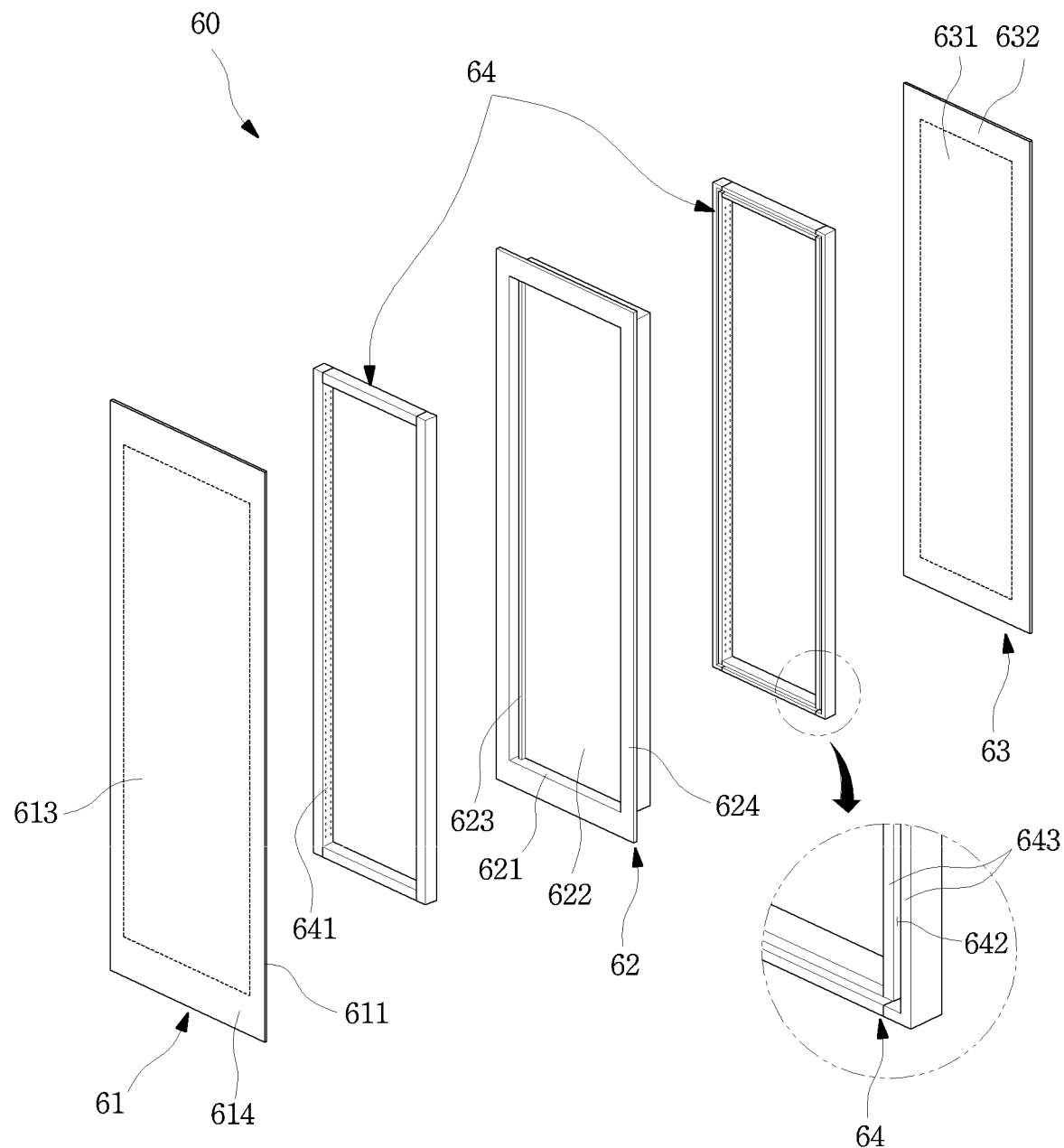
FIG. 5 is an exploded perspective view of a transparent panel assembly of the sub-door.
Figure 6:
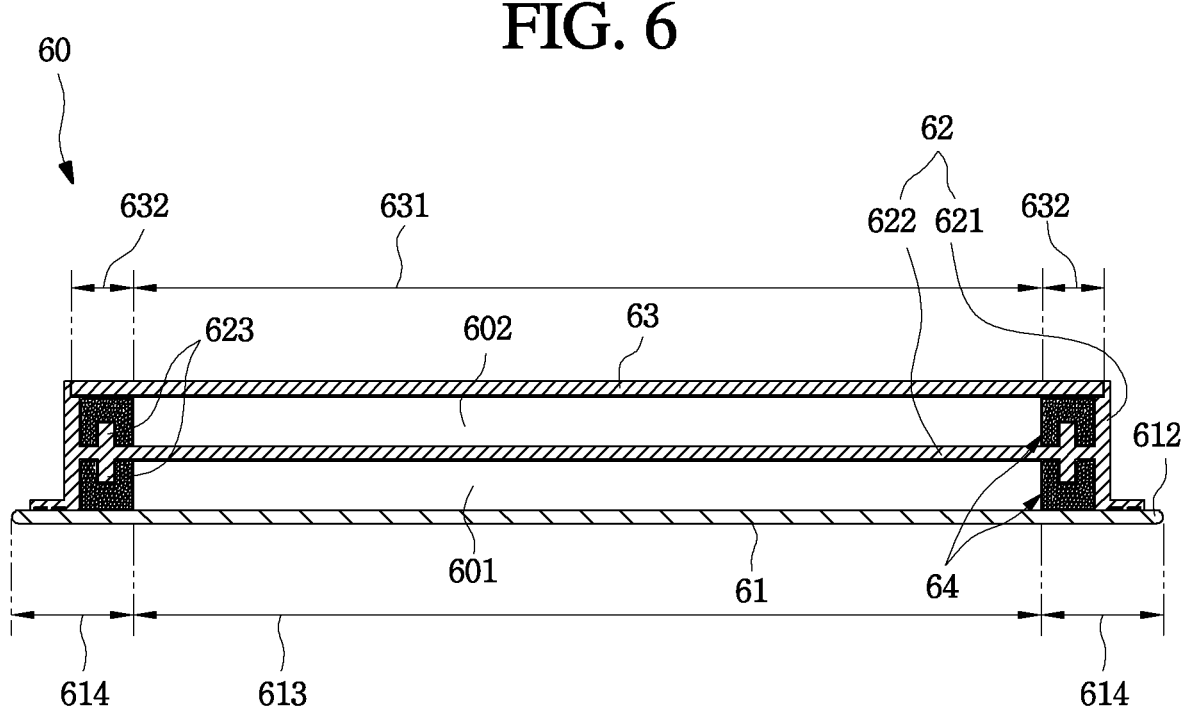
FIG. 6 is a cross-sectional view taken along line 6-6' of FIG. 4.

FIG. 5 is an exploded perspective view of the transparent panel assembly of the sub-door. FIG. 6 is a cross-sectional view taken along line 6-6' of FIG. 4.

The transparent panel assembly 60 will be described in more detail with reference to the accompanying drawings. The transparent panel assembly 60 may include a front panel 61 defining a front appearance, a rear panel 63 defining a rear appearance, and an intermediate member 62 partitioning between the front panel 61 and the rear panel 63 and forming a peripheral surface of the transparent panel assembly 60.

In more detail, the front panel 61 may be made of a glass material. Due to the structural characteristics of forming a part of the front appearance of the refrigerating chamber door 20, the front panel 61 may be made of a tempered glass material having excellent surface texture and excellent strength.

A bezel 611 having a predetermined width may be formed around the rear surface of the front panel 61 so as to shield a front adhesive portion 624 of the intermediate member 62 and a moisture absorbent case 64 to be described in detail below. The bezel 611 may be formed by printing with colored ink or ceramics and may shield a part of the rear side of the front panel 61.

On the other hand, in the entire front panel 61, a portion formed so as to be able to see through the rear side of the front panel 61 from the outside may be defined as a see-through region 613, and a portion formed so as not to be seen through from the outside may be defined as a screening region 614.

That is, in the front panel 61, the inner region of the bezel 611 through which the inner region of the transparent panel assembly 60 can be seen may be defined as a see-through region. In the front panel 61, the region through which the inner region of the transparent panel assembly 60 cannot be seen as the region where the bezel 611 is formed may be defined as a screening region 614.

A portion of the outer periphery of the front panel 61 protruding outward from the intermediate member 62 may be the seating portion 612 attached to the support frame 59. An adhesive may be applied to the seating portion 612 or an adhesive sheet may be attached to the seating portion 612, such that the support frame and the transparent panel assembly are coupled to each other.

Meanwhile, the intermediate member 62 and the rear panel are coupled behind the front panel 61, and a plurality of insulation layers 601 and 602 are formed behind the front panel 61.

The intermediate member 62 and the rear panel 63 may be made of a synthetic resin material and may be made of a transparent material. Typically, the intermediate member 62 and the rear panel 63 may be made of polymethyl methacrylate (PMMA). The polymethyl methacrylate is a colorless transparent material having excellent transparency, has excellent optical properties, weather resistance, mechanical strength, and hardness, is easy to bond, is a material that is very easy to mold the intermediate member 62 and adhere to the rear panel 63, and is suitable for forming the intermediate member 62 and the rear panel 63. Particularly, since the intermediate member 62 is complicated in structure and shape, the intermediate member 62 may be formed by injection molding with a plastic material, and may be effectively molded.

Of course, the intermediate member 62 and the rear panel 63 may be made of other synthetic resin materials having properties similar to polymethyl methacrylate, and the intermediate member 62 and the rear panel 63 may be made of other synthetic resin materials satisfying the conditions for forming the transparent panel assembly 60.

The intermediate member 62 connects the front panel 61 and the rear panel 63 such that the front panel 61 and the rear panel 63 are spaced apart from each other. At the same time, a plurality of insulation layers 601 and 602 are formed between the front panel 61 and the rear panel 63.

In more detail, the intermediate member 62 may include an edge portion 621 and a partition portion 622. The edge portion 621 connects the front panel 61 and the rear panel 63 to form the periphery of the transparent panel assembly 60.

The edge portion 621 may be formed along the periphery of the rear panel 63 and may have a rectangular frame shape. The front end (lower end in FIG. 6) of the edge portion 621 may be attached to the front panel 61. The attaching portion of the edge portion 621 is the inside of the front panel 61 and may be attached to a part of the seating portion 612. The rear end (upper end in FIG. 6) of the edge portion 621 may be attached to the rear panel 63. The rear end of the edge portion 621 is attached to the outer end of the rear panel 63 to form the edge of the transparent panel assembly 60.

Meanwhile, the edge portion 621 may be formed to have a predetermined height, and the partition portion 622 may be formed in an intermediate region of the edge portion 621. The partition portion 622 is connected to the inner periphery of the edge portion 621, and may partition the front panel 61 and the rear panel 63 forward and backward to form a first insulation layer 601 and a second insulation layer 602, respectively.

The partition portion 622 may be disposed on the inner surface of the edge portion 621 and may be formed such that the first and second insulation layers 601 and 602 may have the same thickness. In necessary, the position of the partition portion 622 may be formed such that the widths of the first insulation layer 601 and the second insulation layer 602 are different from each other.

Meanwhile, the first insulation layer 601 and the second insulation layer 602 may be sealed to the outside, and the insulation performance by the air layer can be ensured. The inside of the first insulation layer 601 and the second insulation layer 602 may be filled with an insulating gas such as argon (Ar) so as to improve the insulation performance. The first insulation layer 601 and the second insulation layer 602 may make the inside vacuum to ensure the insulation performance.

Further, the partition portion 622 may be arranged in plurality in a front and rear direction, or two or more insulation layers may be formed. The insulation performance of the transparent panel assembly 60 may be further improved by the increase of the insulation layer.

Mounting protrusions 623 may be formed along the peripheries of the front and rear surfaces of the partition portion 622. The mounting protrusion 623 may protrude from a position that faces the front surface and the rear surface of the partition portion 622, and may protrude forward and rearward, that is, toward the front panel 61 and the rear panel 63 so as to be inserted into the moisture absorbent case 64 such that the moisture absorbent case 64 is fixed.

The mounting protrusion 623 protrudes perpendicularly to the partition portion 622 and may protrude from a position spaced apart from the edge portion 621 by a predetermined distance. The mounting protrusion 623 may be continuously formed in a rib shape along the periphery of the partition portion 622 so as to fix the moisture absorbent case 64 as a whole. If the moisture absorbent case 64 can be fixed, the mounting protrusions 623 may be formed in the form of a plurality of protrusions arranged at regular intervals along the periphery of the partition portion 622.

Meanwhile, the intermediate member 62 may be injection-molded such that the entire structure may be integrally molded. That is, the entire structure of the intermediate member 62, including the edge portion 621 and the partition portion 622, may be molded at one time by the injection molding. When the shape of the intermediate member 62 is complicated or structurally impossible to mold, the intermediate member 62 may have a structure in which one or more structures are molded and then coupled to each other.

The moisture absorbent case 64 has a space in which the moisture absorbent 640 is accommodated and may be mounted on the mounting protrusion 623. The moisture absorbent case 64 may be formed in a hollow bar shape as a whole, and may be formed along the entire periphery of the partition portion 622. If necessary, the moisture absorbent case 64 may be formed on only a part of the periphery of the partition portion 622, such as the left and right sides or the upper and lower sides of the partition portion 622.

Silicon dioxide ($SiO_2$) and aluminum oxide ($Al_2O_3$) may be used as the moisture absorbent 640 accommodated in the moisture absorbent case 64, and may be filled in the moisture absorbent case 64. A plurality of case holes 641 may be formed on the inner surface of the moisture absorbent case 64 facing the insulation layers 601 and 602. Moisture remaining in the insulation layers 601 and 602 or moisture infiltrating into the insulation layers 601 and 602 may be absorbed by the moisture absorbent 640 by the case holes 641. Therefore, the space inside the insulation layers 601 and 602 may be kept in a transparent state without generating condensation.

The moisture absorbent case 64 may be extruded from plastic or aluminum, and at least one of the moisture absorbent case 64 may be connected to each other. For example, the moisture absorbent case 64 may include four portions formed along the peripheral edges of the partition portion 622, and each end portion thereof may be formed so as to be in contact with each other.

A mounting groove 642 having a shape corresponding to the mounting protrusion 623 may be formed on one surface of the moisture absorbent case 64 such that the mounting protrusion 623 is inserted thereinto. A pair of support portions 643 may be formed on both sides of the mounting groove 642. The lower end of the support portion 643 may be formed to have a length that can be in contact with the partition portion 622. The support portion 643 of one of the pair of support portions 643 may be configured to be in close contact with the edge portion 621. Meanwhile, the surface opposite to the surface on which the mounting groove 642 is formed may be in close contact with the front panel 61 or the rear panel 63.

As described above, the moisture absorbent case 64 may have a rectangular cross section except for the mounting groove 642. Therefore, when the moisture absorbent case 64 is mounted, the moisture absorbent case 64 may be in contact with the entire surface of the mounting protrusion 623, the partition portion 622, the edge portion 621, the front panel 61, and the rear panel 63.

The moisture absorbent case 64 may function to support the front panel 61 and the rear panel 63. Therefore, the moisture absorbent case 64 may have the function of reinforcing the strength of the front panel 61 and the rear panel 63. In addition, the edge portion 621 may be supported to reinforce the peripheral surface of the transparent panel assembly 60.

The moisture absorbent case 64 is formed so as to be covered by the bezel 611. That is, the lateral width of the moisture absorbent case 64 is set such that the end of the moisture absorbent case 64 is located at a position where the end of the moisture absorbent case 64 is not deviated from the bezel 611. Therefore, the moisture absorbent case 64 may be covered when viewed from the front of the refrigerating chamber door 20.

The rear panel 63 may be mounted at the rear end of the intermediate member 62, that is, at the rear end of the edge portion 621. The rear panel 63 may be injection-molded from the same transparent plastic material as the intermediate member 62. The rear panel 63 may be coupled to the intermediate member 62 in a state of being molded in a plate shape so as to shield the entire opened rear surface of the intermediate member 62.

The rear panel 63 may be formed to correspond to the size of the opened rear surface of the intermediate member 62. Therefore, the rear panel 63 is brought into contact with the rear end of the intermediate member 62, and may be in contact with one surface of the moisture absorption case 64 so as to support the periphery thereof. The rear panel 63 forms the rear surface of the transparent panel assembly 60 in a state of being coupled to the intermediate member 62.

The rear panel 63 may also include a see-through region 631 through which the rear space of the rear panel 63 can be seen through the rear panel 63 and a screening region 632 that is not seen through the rear panel 63. The see-through region 631 may have a size corresponding to the see-through region 613 of the front panel 61 and may be provided at a corresponding position. Therefore, the user can see through the rear of the transparent panel assembly 60 through the see-through region 613 of the front panel 61 and the see-through region 631 of the rear panel 63.

The screening region 632 of the rear panel 63 may not be subjected to another opacity process. However, the screening region 632 is a portion where the intermediate member 62 and the moisture absorbent case 64 may be disposed, and a portion covered by these structures cannot be seen through.

Therefore, both ends of the edge portion 621 of the intermediate member 62 may connect the screening regions 614 and 632 of the front panel 61 and the rear panel 63 with each other. That is, the front end of the edge portion 621 of the intermediate member 62 may be defined as being coupled to one side of the screening region 614 of the front panel 61, and the rear end of the edge portion 621 may be defined as being coupled to one side of the screening region 632 of the rear panel 63.

Figure 7:
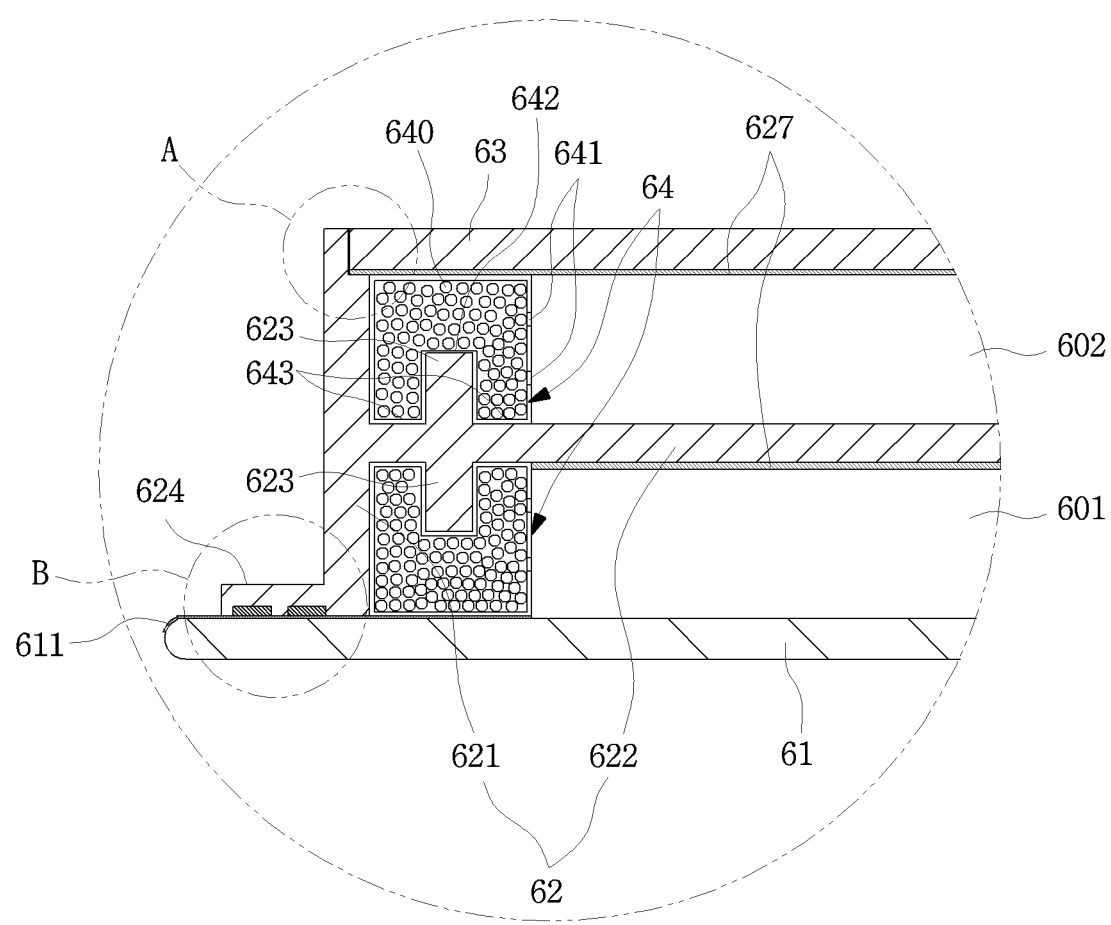
FIG. 7 is a partial cross-sectional view of the transparent panel assembly.
Figure 8:
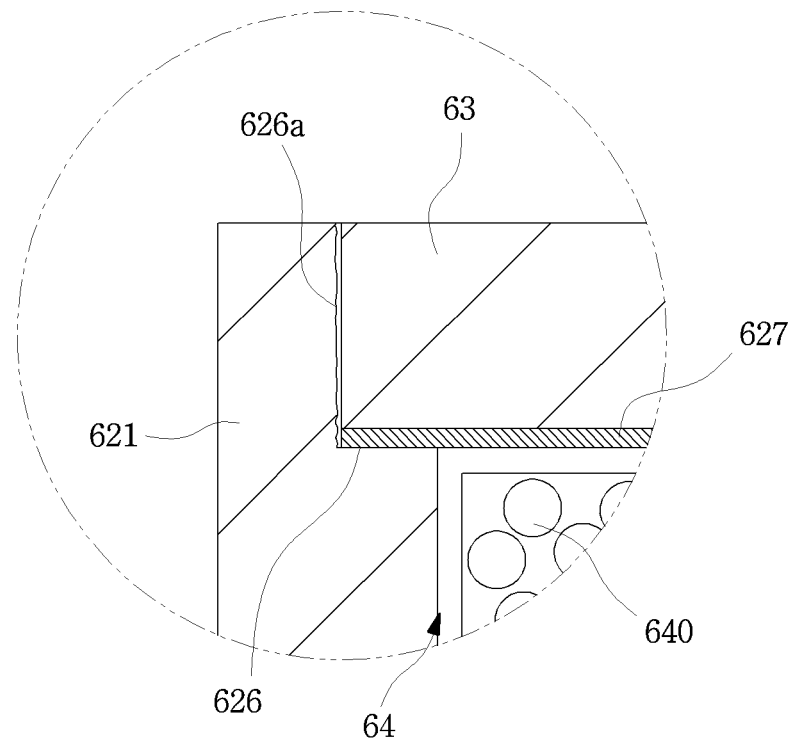
FIG. 8 is an enlarged view of a portion A of FIG. 7.
Figure 9:
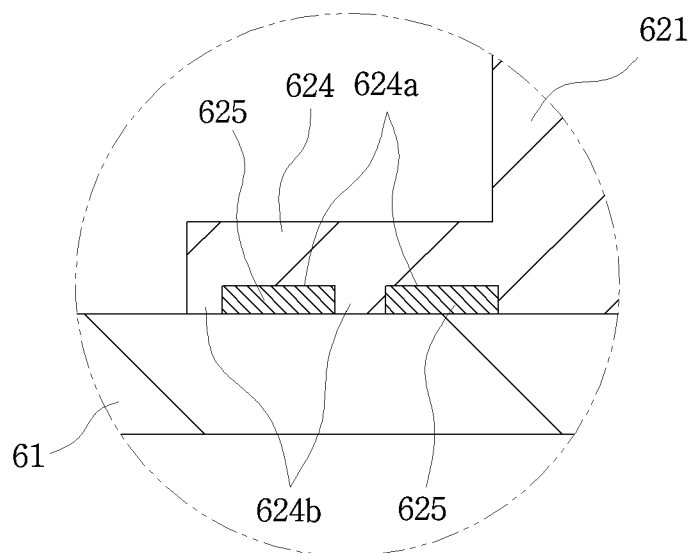
FIG. 9 is an enlarged view of a portion B in FIG. 7.

FIG. 7 is a partial cross-sectional view of the transparent panel assembly. FIG. 8 is an enlarged view of a portion A of FIG. 7. FIG. 9 is an enlarged view of a portion B in FIG. 7.

The coupling structure of the transparent panel assembly will be described in more detail with reference to the accompanying drawings. A front adhesive portion 624 extending outwardly may be formed at the front end (lower end in FIG. 7) of the edge portion 621.

The front adhesive portion 624 is a portion contacting the rear surface of the front panel 61 and may be bent outward vertically at the front end of the edge portion 621. Therefore, the front adhesive portion 624 is in contact with the front panel and is formed to have a predetermined width to provide a sufficient surface to be attached to the front panel 61.

An adhesive groove 624a and an adhesive protrusion 624b may be formed on the front surface of the front adhesive portion 624 which contacts the front panel 61. The adhesive groove 624a is recessed along the periphery of the front panel 61 such that the adhesive 625 can be accommodated therein. A plurality of the adhesive grooves 624a may be formed at regular intervals. The adhesive protrusions 624b protrude between the plurality of adhesive grooves 624a and come into contact with the front panel 61. The space in which the adhesive 625 may be accommodated due to the structure of the adhesive groove 624a and the adhesive protrusion 624b is ensured such that a sufficient amount of the adhesive 625 may be provided. Further, the front panel 61 and the intermediate member 62 may be firmly coupled by increasing the adhesive surface area.

The adhesive 625 accommodated in the adhesive groove 624a may be made of a material to which the front panel 61 made of glass and the intermediate member 62 made of the plastic material are attached. In addition to the conventional adhesives, an adhesive by silicone sealants is also possible.

The adhesive 625 may be a UV adhesive 625 that is cured by ultraviolet light. Due to the characteristics of the material made of the transparent plastic material, when the intermediate member 62 is irradiated with ultraviolet light in a state where the adhesive is applied to the adhesive groove 624a, ultraviolet light may be transmitted through the intermediate member 62 to cure the adhesive 625. Therefore, the front panel 61 and the intermediate member 62 may be firmly attached to each other within a short time of about 2 seconds to 3 seconds.

A stepped portion 626 may be formed at the rear end (upper end in FIG. 7) of the intermediate member 62, that is, at the rear end of the edge portion 621. The stepped portion 626 may be a portion where the periphery of the rear panel 63 is seated and may be formed such that a portion of the end of the intermediate member 62 is stepped. The stepped portion 626 may be formed along the entire rear end of the edge portion 621 so as to support the entire periphery of the rear panel 63.

The recessed depth of the stepped portion 626 may be the same as the thickness of the rear panel 63. Therefore, the rear end of the edge portion 621 and the rear end of the rear panel 63 may be located on the same plane to form a smooth corner when the rear panel 63 is seated. The size of the rear panel 63 may be formed to be in a size such that the rear panel 63 can be completely in contact with the inner surface of the stepped portion 626 in a state of being seated on the stepped portion 626.

The end of the rear panel 63 and the stepped portion 626 may be welded together in a state where the rear panel 63 is seated on the stepped portion 626. That is, when the ultrasonic vibration is generated in a state where the rear panel 63 and the stepped portion 626 are in contact with each other, the contact surfaces of the rear panel 63 and the stepped portion 626 may be welded together. At this time, when a concavo-convex portion 626a finely machined is formed on one side of the stepped portion in contact with the rear panel, welding due to vibration may be more robust. The bonding portions of the rear panel 63 and the intermediate member 62 may be completely coupled to each other by the vibration welding.

The adhesive 625 made of a UV adhesive is applied between the rear panel 63 and the stepped portion 626. The rear panel 63 and the intermediate member 62 may be coupled to each other through curing of the adhesive 625 by irradiation of ultraviolet light.

Meanwhile, an insulation coating layer 627 may be formed on the partition portion 622 of the intermediate member 62. The insulation coating layer 627 may be formed on the surface of the partition portion 622 in a soft low-e method. That is, the insulation coating layer 627 may be formed on the surface of the partition portion 622 by sputtering using a metal such as silver (Ag) or titanium (Ti) compound. With this method, it is possible to form the insulation coating layer 627 without damaging the surface of the intermediate member 62 made of the plastic material.

The insulation coating layer 627 may shield the far-infrared rays emitted toward the transparent panel assembly 60, thereby blocking heat transfer by radiation. Heat transfer due to conduction and convection which are not blocked by the insulation coating layer 627 may be blocked by the insulation layers 601 and 602.

The insulation coating layer 627 may be formed on the front surface or the rear surface of the partition portion 622 and may have excellent insulation performance. The degree of freedom of optical performance is high so that the partition portion 622 may maintain a transparent state.

Meanwhile, the insulation coating layer 627 may be formed on the surface of the rear panel 63. At this time, since the insulation coating layer 627 is vulnerable to scratches, it is preferable that the insulation coating layer 627 is formed on the entire surface contacting the second insulation layer 602.

Figure 10:
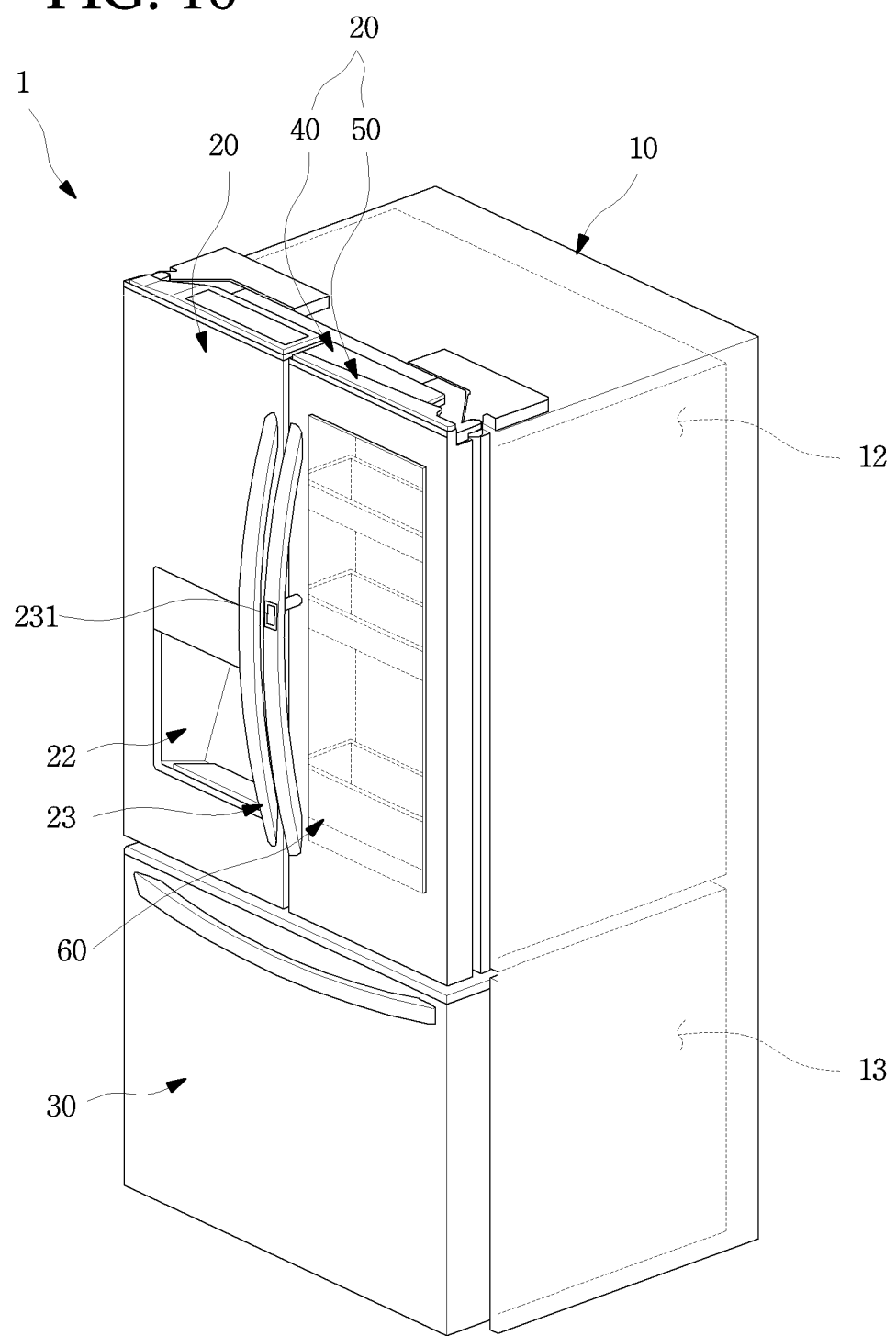
FIG. 10 is a perspective view of the refrigerator when the transparent panel assembly is transparent.

FIG. 10 is a perspective view of the refrigerator when the transparent panel assembly is transparent.

As illustrated in the drawing, the door light 54 of the refrigerator 1 may be turned on by a user's manipulation. When the door light 54 is turned on, the transparent panel assembly 60 is transparent in a state where the rear of the transparent panel assembly 60, that is, the door storage space is brightened, and it is possible to see through the internal space behind the transparent panel assembly 60. In this state, the user may grasp the storing position and the state of the food.

The door light 54 may be turned off by the elapse of the set time or a user's direct manipulation. When the door light 54 is turned off, the rear of the transparent panel assembly 60 becomes dark. The internal space behind the transparent panel assembly 60 cannot be seen through as illustrated in FIG. 1.

Meanwhile, various embodiments other than the above-described embodiment are possible. Hereinafter, another embodiment of the present disclosure will be described with reference to the accompanying drawings. The same reference numerals are used for the same constituent elements as those of the above-described embodiment among the constituent elements of other embodiments of the present disclosure, and a detailed description thereof will be omitted.

Figure 11:
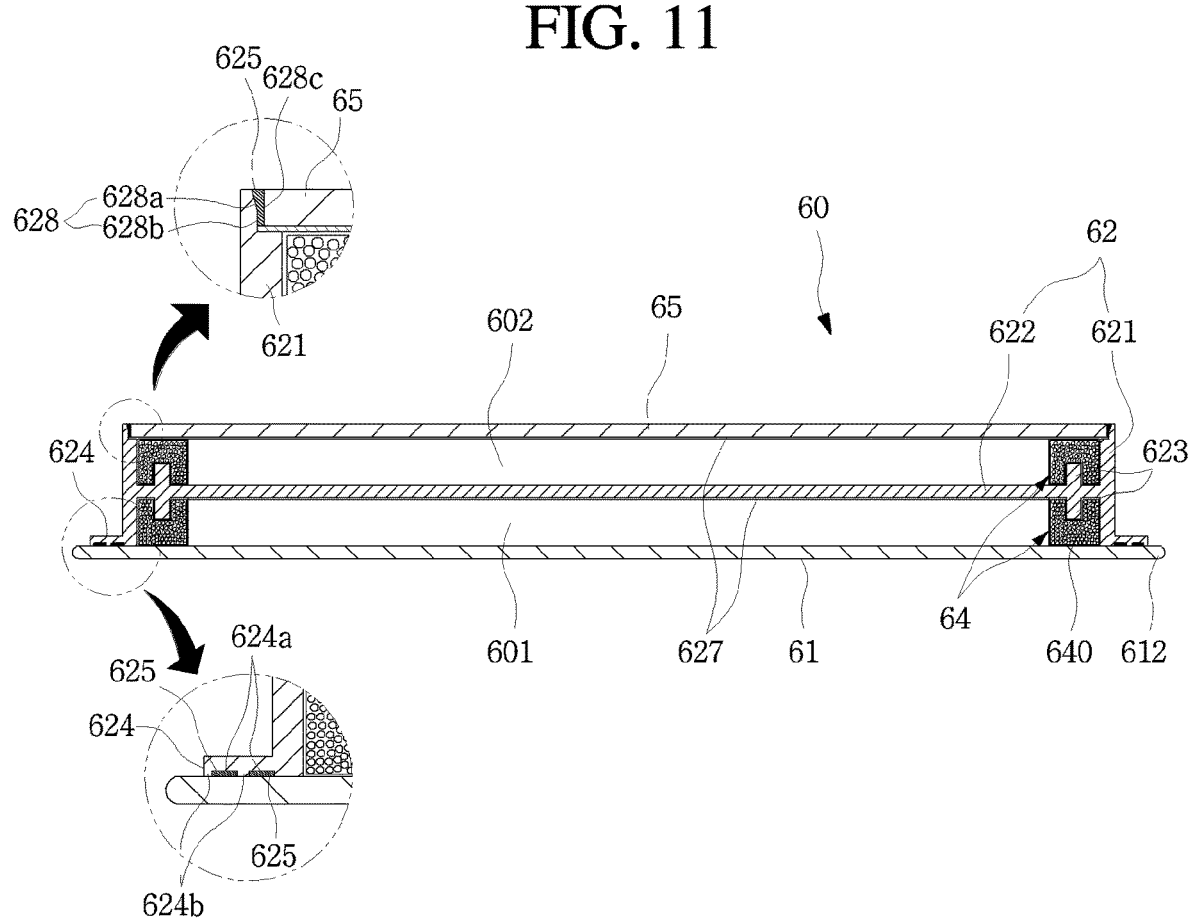
FIG. 11 is a cross-sectional view of a transparent panel assembly according to a second embodiment of the present disclosure.

FIG. 11 is a cross-sectional view of a transparent panel assembly according to a second embodiment of the present disclosure.

As illustrated in the drawing, the transparent panel assembly 60 according to the second embodiment of the present disclosure may include a front panel 61, a rear panel 65, and an intermediate member 62 between the front panel 61 and the rear panel 65.

The front panel 61 and the rear panel 65 may be made of a glass material, and may be made of the same material. The front panel 61 may be made of tempered glass since the front panel 61 is exposed to the outside to form an external appearance. The rear panel 65 may be made of a low-e glass to improve the insulation performance.

The front panel 61 may be made of a tempered glass material to form the front appearance of the transparent panel assembly 60, as in the previous embodiment.

The intermediate member 62 may be made of a transparent plastic material as in the above-described embodiment. The intermediate member 62 may include an edge portion 621 and a partition portion 622.

The edge portion 621 is configured to connect the front panel 61 and the rear panel 65, and a front adhesive portion 624 may be formed at a front end of the edge portion 621. The front adhesive portion 624 may include an adhesive groove 624a and an adhesive protrusion 624b filled with an adhesive 625. A stepped portion 628 may be formed at a rear end of the edge portion 621 so as to be attached to the rear panel 65.

The stepped portion 628 may be formed in the form in which the inner surface of the rear end of the edge portion 621 is recessed so that the rear panel 65 is seated. The rear end of the edge portion 621 and the rear surface of the rear panel 65 may be formed on the same plane in a state where the rear panel 65 is seated on the stepped portion 628.

Meanwhile, one side of the stepped portion 626 facing the outer end of the rear panel 65 may be spaced apart from the outer edge of the rear panel 65 to form a space 628c. The adhesive 625 may be filled between the outer end of the rear panel 65 and one surface of the stepped portion 628.

At this time, one surface of the stepped portion 628 may include an inclined portion 628a and an extension portion 628b. The inclined portion 628a extends forward from the rear end of the edge portion 621, but extends in a direction approaching the outer end of the rear panel 65 to form the inclined surface. The extension portion 628b extends from the end of the inclined portion 628a to the bottom surface of the stepped portion 628, but may be formed to intersect perpendicularly with the bottom surface of the stepped portion 628.

That is, the space 628c between the outer end of the rear panel 65 and the stepped portion 628 may be formed to be narrowed from the rear toward the front. Therefore, when the adhesive 625 is injected into the space 628c, the adhesive 625 may effectively fill the space.

The adhesive 625 may be rapidly cured by irradiation of ultraviolet light due to the characteristics of the intermediate member 62 and the rear panel 65 formed to be transparent with the same UV adhesive as the adhesive 625 applied to the front adhesive portion 624, and may couple the intermediate member 62 and the rear panel 65.

Meanwhile, the partition portion 622 may be formed on the inner side of the edge portion 621. A first insulation layer 601 and a second insulation layer 602 may be formed between the front panel 61 and the rear panel 65 by the partition portion 622.

The mounting protrusion 623 may be formed on the outer side of the partition portion 622, and the moisture absorbent case 64 may be mounted on the mounting protrusion 623. A moisture absorbent 640 may be filled inside the moisture absorbent case 64, and the front panel 61 and the rear panel 63 may be supported by the moisture absorbent case 64.

An insulation coating layer 627 may be formed on the surface of the partition portion 622, and the radiation insulation performance of the transparent panel assembly 60 may be improved by the insulation coating layer 627. Conductive and convection insulation performance of the transparent panel assembly 60 may be improved by the first insulation layer 601 and the second insulation layer 602.

Figure 12:
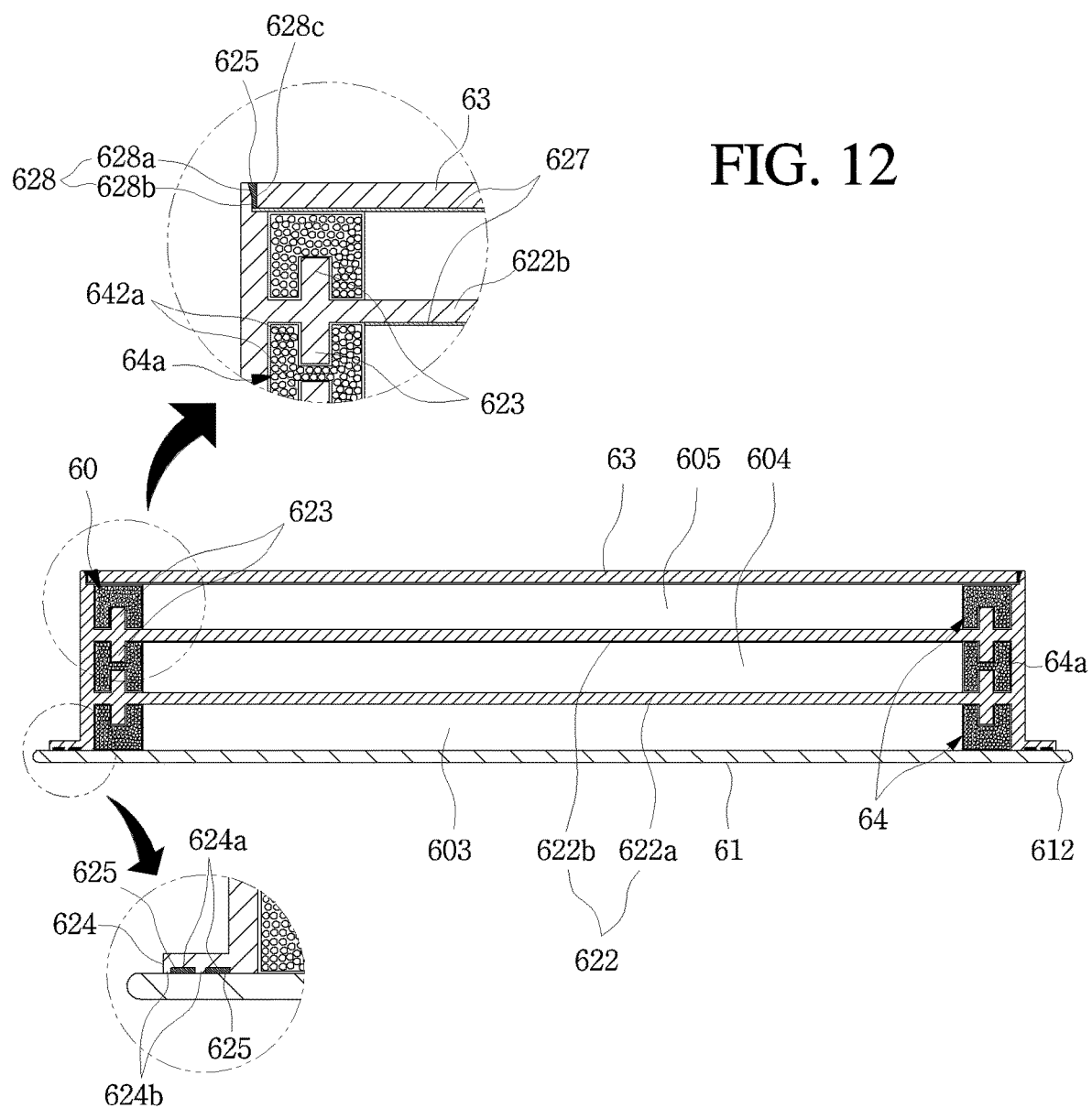
FIG. 12 is a cross-sectional view of a transparent panel assembly according to a third embodiment of the present disclosure.

FIG. 12 is a cross-sectional view of a transparent panel assembly according to a third embodiment of the present disclosure.

As illustrated in the drawing, the transparent panel assembly 60 according to the second embodiment of the present disclosure may include a front panel 61, a rear panel 63, and an intermediate member 62 between the front panel 61 and the rear panel 63.

The front panel 61 may be made of a tempered glass material to form the front appearance of the transparent panel assembly 60, as in the previous embodiment.

The intermediate member 62 may be made of a transparent plastic material as in the above-described embodiment. The intermediate member 62 may include an edge portion 621 and a partition portion 622.

The edge portion 621 is configured to connect the front panel 61 and the rear panel 63, and a front adhesive portion 624 may be formed at a front end of the edge portion 621. The front adhesive portion 624 may include an adhesive groove 624a and an adhesive protrusion 624b filled with an adhesive 625. A stepped portion 628 may be formed at a rear end of the edge portion 621 so as to be attached to the rear panel 63.

The stepped portion 628 may include an inclined portion 628a and an extension portion 628b as in the above-described embodiment, and a space for injecting an adhesive 625 may be formed in a space 628c between the stepped portion 628 and the outer end of the rear panel 63.

Meanwhile, partition portions 622a and 622b may be formed on the inner side of the edge portion 621. The partition portions 622a and 622b may include a first partition portion 622a and a second partition portion 622b, and may be spaced apart in a front and rear direction.

Therefore, in a state where the intermediate member 62 is coupled to the front panel 61 and the rear panel 63, a third insulation layer 603, a fourth insulation layer 604, and a fifth insulation layer 605 may be formed by the first partition portion 622a and the second partition portion 622b. The third insulation layer 603, the fourth insulation layer 604, and the fifth insulation layer 605 may be filled with insulating gas for heat insulation and may be in a vacuum state.

Meanwhile, a mounting protrusion 623, to which the moisture absorbent case 64 is fixedly mounted, may be formed around the outer periphery of the first partition portion 622a and the second partition portion 622b. The moisture absorbent case 64 has a structure that can be mounted on the mounting protrusion 623, and may be arranged to be in contact with the front panel 61 and the rear panel 63. The structure of the moisture absorbent case 64 may be the same as that of the above-described embodiment.

An intermediate moisture absorbent case 64 may be provided between the first partition portion 622a and the second partition portion 622b. The intermediate moisture absorbent case 64 has the front and rear surfaces having the same structure, and mounting grooves 642a may be respectively formed thereon. The pair of mounting grooves 642a may be coupled to the mounting protrusions 623 respectively formed on the rear surface of the first partition portion 622a and the front surface of the second partition portion 622b, and may support between the first partition portion 622a and the second partition portion 622b.

Meanwhile, the entire intermediate member 62 may be injection-molded in one configuration. When a plurality of partition portions 622a, 622b are provided to complicate the structure, the intermediate member 62 may be configured to be molded in a plurality of configurations and then coupled to each other to form the shape of the intermediate member 62 so as to facilitate molding.

In addition, insulation coating layers 627 may be formed in the first partition portion 622a and the second partition portion 622b. The insulation performance of the transparent panel assembly 60 may be further improved by the insulation coating layers 627.

Meanwhile, the rear panel 63 may be coupled to the rear end of the intermediate member 62, and may be made of the same plastic material as that of the intermediate member 62. The insulation coating layer 627 may be formed on one surface of the intermediate member 62.

FIG. 13 is a cross-sectional view of a transparent panel assembly according to a fourth embodiment of the present disclosure.

As illustrated in the drawing, the transparent panel assembly 60 according to the fourth embodiment of the present disclosure may include a front panel 66, an intermediate member 62, and a rear panel 65.

The front panel 66 and the rear panel 65 may be made of a glass material, and may be made of the same material. The front panel 66 may be made of tempered glass since the front panel 61 is exposed to the outside to form an external appearance. The rear panel 65 may be made of a low-e glass to improve the insulation performance.

Since the front panel 66 and the rear panel 65 are formed to have the same size, the transparent panel assembly 60 has the same shape and structure as those of the front and rear surfaces. The entire peripheral surface of the transparent panel assembly 60 may be formed by the intermediate member 62 without a portion protruding to the outside.

The intermediate member 62 may include an edge portion 621 defining a peripheral surface, and a partition portion 622 that partitions a gap between the front panel 61 and the rear panel 63 to form a first insulation layer 601 and a second insulation layer 602.

The edge portion 621 may extend perpendicularly to the partition portion 622, the front panel 66, and the rear panel 65. The front end and the rear end may be coupled to the outer ends of the front panel 66 and the rear panel 65, respectively.

To this end, stepped portions 628 may be formed at the front end and the rear end of the edge portion 621, respectively. The stepped portion 628 may include an inclined portion 628a and an extension portion 628b in the same manner as in the second embodiment described above, and may be formed at both the front end and the rear end of the edge portion 621.

Therefore, the front panel 66 and the rear panel 65 are seated on the stepped portions 628 formed at the front and rear ends of the edge portion 621, respectively. The adhesive 625 made of the UV adhesive material may be injected into the space 628c between the stepped portion 628 and the outer ends of the front panel 61 and the rear panel 63 and then cured by irradiating ultraviolet light. By this process, the intermediate member 62, the front panel 66, and the rear panel 65 can be coupled to each other.

The mounting protrusion 623 may be formed on the outer side of the partition portion 622, and the moisture absorbent case 64 may be mounted on the mounting protrusion 623. A moisture absorbent 640 may be filled inside the moisture absorbent case 64, and the front panel 61 and the rear panel 63 may be supported by the moisture absorbent case 64.

An insulation coating layer 627 may be formed on the surface of the partition portion 622, and the radiation insulation performance of the transparent panel assembly 60 may be improved by the insulation coating layer 627. Conductive and convection insulation performance of the transparent panel assembly 60 may be improved by the first insulation layer 601 and the second insulation layer 602.

FIG. 14 is a cross-sectional view of a transparent panel assembly according to a fifth embodiment of the present disclosure.

As illustrated in the drawing, the transparent panel assembly 60 according to the fifth embodiment of the present disclosure may include a front panel 61, a rear panel 63, and an intermediate member 62 between the front panel 61 and the rear panel 63.

As in the above-described embodiment, the front panel 61 may be made of a glass material, and the rear panel 63 and the intermediate member 62 may be made of a transparent plastic material. The intermediate member 62 may include an edge portion 621 and a partition portion 622.

The edge portion 621 is configured to connect the front panel 61 and the rear panel, and a front adhesive portion 624 may be formed at a front end of the edge portion 621. A stepped portion 626 may be formed at a rear end of the edge portion 621 so as to be seated and coupled to the rear panel 65.

Meanwhile, the partition portion 622 may be formed on the inner side of the edge portion 621. A first insulation layer 601 and a second insulation layer 602 may be formed between the front panel 61 and the rear panel 65 by the partition portion 622.

A moisture absorbent case 64' may be provided between the partition portion 622 and the front panel 61 and between the partition portion 622 and the rear panel 62. The moisture absorbent case may be formed along the inner peripheries of the first insulation layer 601 and the second insulation layer 602, and may be provided between the partition portion 622 and the front panel 61 and between the partition portion 622 and the rear panel 62 to support the front panel 61 and the rear panel 62.

The moisture absorbent case 64' may be formed to have a rectangular cross section and may be filled with a moisture absorbent 640 therein. The moisture absorbent case 64' may be formed to have a size that can be in close contact with the partition portion 622, the edge portion 621, and the front panel 61 or the rear panel 62.

The outer surface of the moisture absorbent case 64' may be coated with an adhesive or an adhesive sheet. The moisture absorbent case 64' may be fixedly mounted inside the first insulation layer 601 and the second insulation layer 602. Therefore, the partition portion 622 may be coupled to the moisture absorbent case 64' without any additional structure.

A case hole 641 is formed in the inner surface of the moisture absorbent case 64' facing the first insulation layer 601 and the second insulation layer 602 and is configured to absorb moisture in the first insulation layer 601 and the second insulation layer 602.

Figure 15:
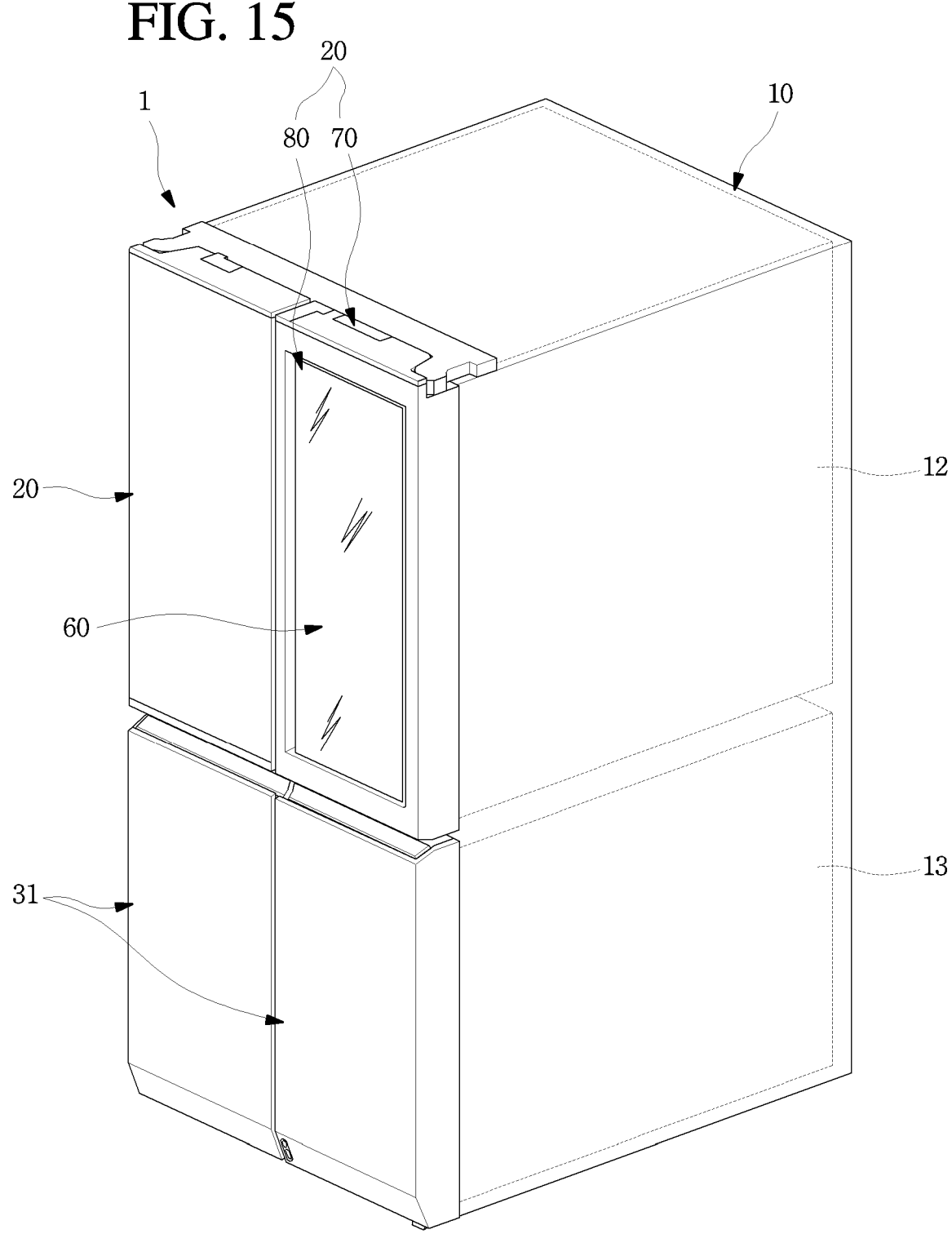
FIG. 15 is a perspective view of a refrigerator according to a sixth embodiment of the present disclosure.
Figure 16:
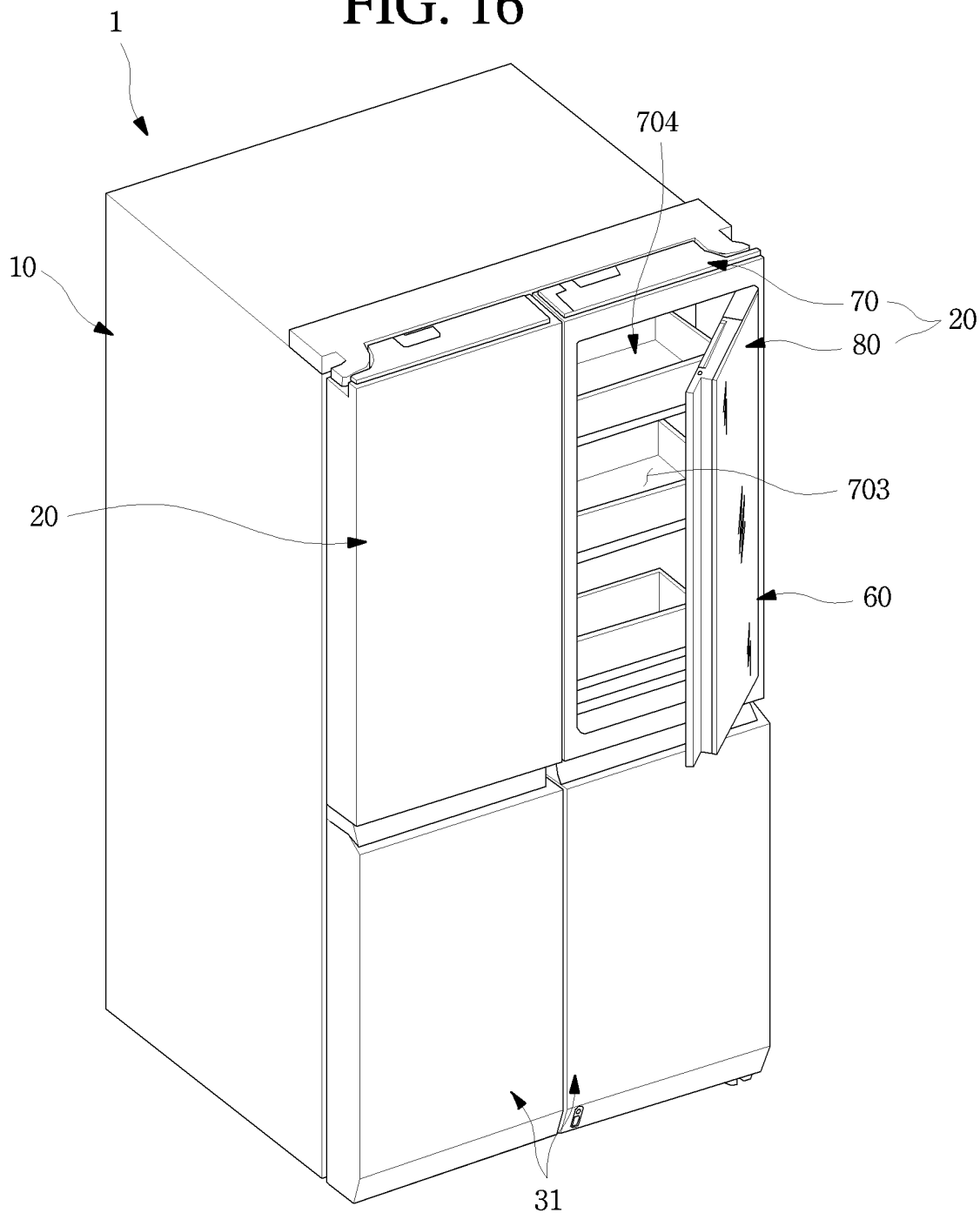
FIG. 16 is a perspective view illustrating a state in which a sub-door of the refrigerator is opened.
Figure 17:
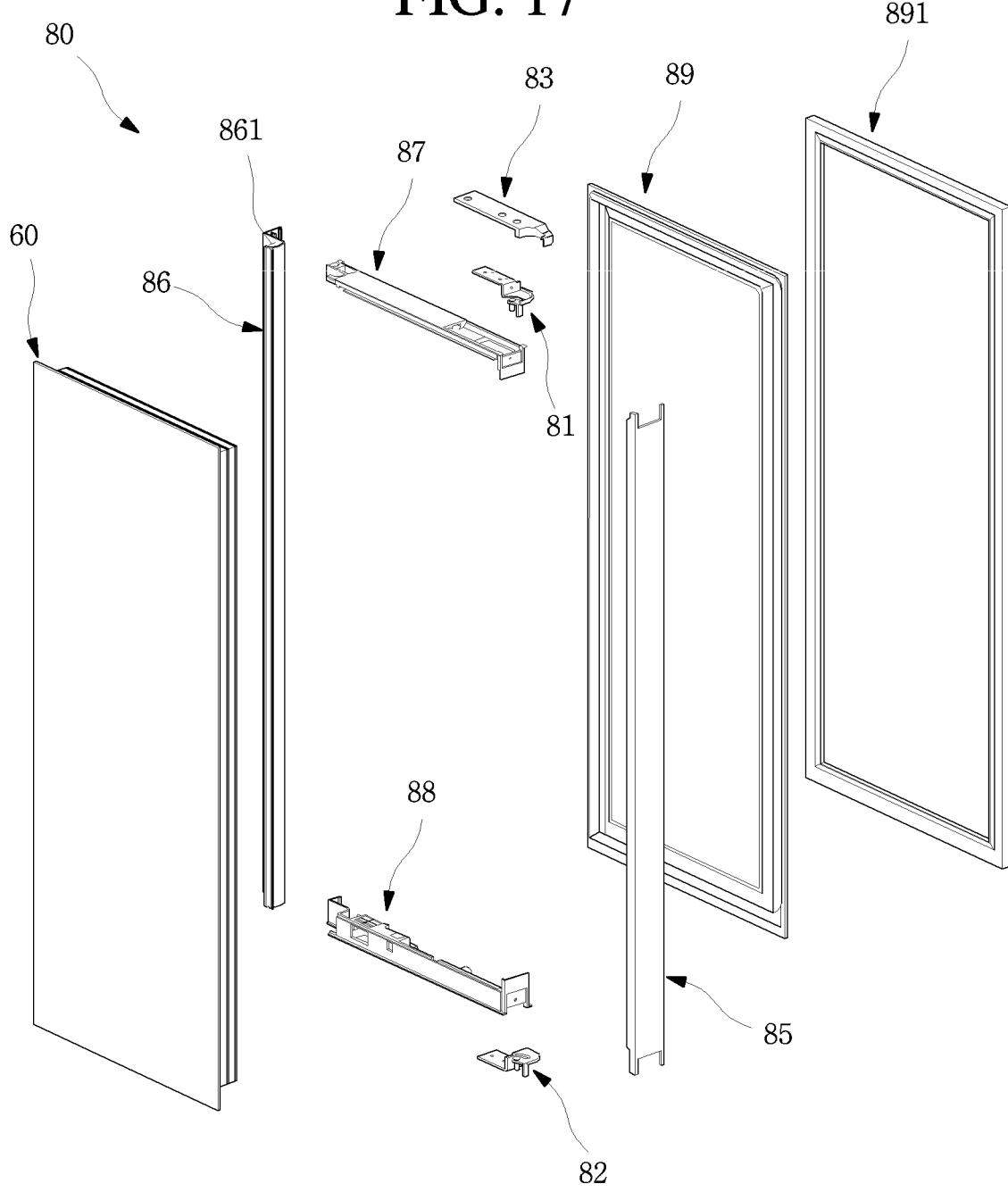
FIG. 17 is an exploded perspective view of the sub-door.

FIG. 15 is a perspective view of a refrigerator according to a sixth embodiment of the present disclosure. FIG. 16 is a perspective view illustrating a state in which a sub-door of the refrigerator is opened. FIG. 17 is an exploded perspective view of the sub-door.

In the sixth embodiment of the present disclosure, the transparent panel assemblies 60 of the above-described embodiments may be applied to the door of the refrigerator 1 having another structure.

As illustrated in the drawing, the refrigerator 1 according to the fifth embodiment of the present discloses may form an appearance by a cabinet 10 forming a refrigerating chamber and a freezing chamber, a refrigerating chamber door 20 that opens and closes the refrigerating chamber 12 and the freezing chamber 13, and a freezing chamber door 31.

The right door among the pair of refrigerating chamber doors 20 may include a main door 70 and a sub-door 80 that are doubly opened and closed.

The main door 70 may be formed to have the same size as the refrigerating chamber door 20 on the left side among the pair of refrigerating chamber doors 20, and may be pivotably mounted in the cabinet 10 to open and close a part of the refrigerating chamber 12. An opening 703 may be formed in the main door 70, and a door storage space accessible through the opening 703 may include a door basket 704.

A door light (not illustrated) may be provided in the opening 403. The transparent panel assembly 60 may be selectively transparent according to the on/off state of the door light (not illustrated) such that the interior of the door storage space can be seen through.

The sub-door 80 is rotatably mounted inside the opening 703 to open and close the opening 703. At least a part of the sub-door 80 may be formed by the transparent panel assembly 60. Therefore, even when the sub-door 80 is closed, the interior of the opening 703 may be seen through. In a state where the sub-door 80 is closed, the front appearance of the refrigerating chamber door 20 is formed together with the front surface of the main door 70.

In more detail, as in the above-described embodiments, the sub-door 80 may include a transparent panel assembly 60, side frames 85 and 86 forming both side surfaces of the sub-door 80, a sub-door liner 89 forming a rear periphery of the sub-door 50, and an upper cap decoration 87 and a lower cap decoration 88 forming the upper and lower surfaces of the sub-door 50.

The first side frame 85 is elongated in the vertical direction, and the first side frame 85 is configured to connect an upper hinge 81 and a lower hinge 82 which are connected through the inner surface of the opening 703 so that the sub-door 50 is rotatably mounted.

Unlike the first side frame 85, the second side frame 86 may be made of a metal or a material having high strength. The second side frame 86 may extend from the upper end to the lower end of the sub-door 50, and a recessed handle 861 may be formed such that the user can insert his/her hand thereinto.

The upper hinge 81 and the lower hinge 82 are mounted on the upper cap decoration 87 and the lower cap decoration 88, respectively, and the upper hinge 81 may be shielded by the hinge cover 83.

The sub-door liner 89 forms a shape around the rear periphery of the sub-door 50 and may be injection-molded with a plastic material. The sub-door liner 89 is coupled to the first side frame 85 and the second side frame 86, and the upper cap decoration 87 and the lower cap decoration 88. Further, a sub-door gasket 891 may be provided on the rear surface of the sub-door liner 89.

Figure 18:
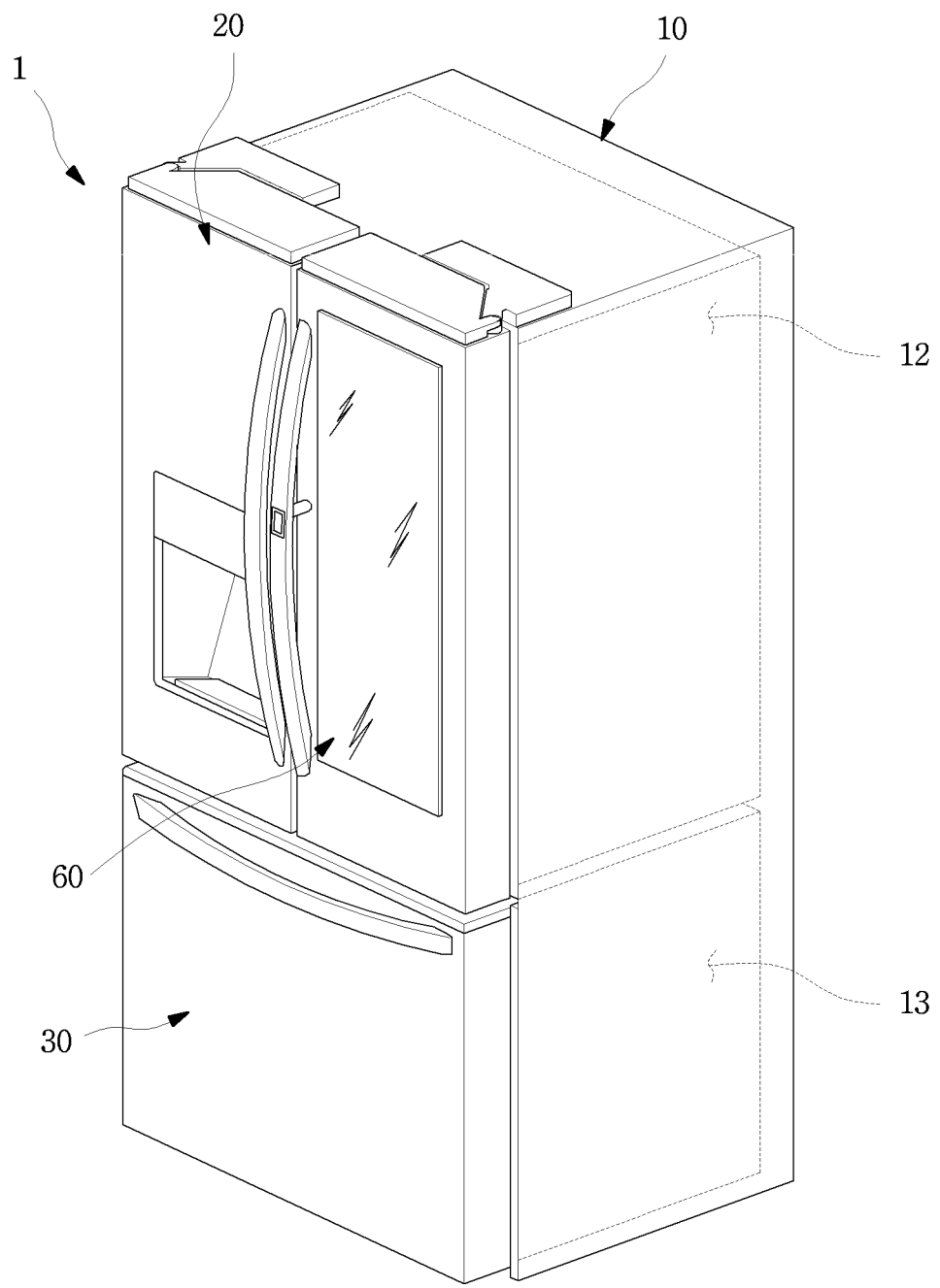
FIG. 18 is a perspective view of a refrigerator according to a seventh embodiment of the present disclosure.

FIG. 18 is a perspective view of a refrigerator according to a seventh embodiment of the present disclosure.

In the seventh embodiment of the present disclosure, the transparent panel assemblies 60 of the above-described embodiments may be applied to the door of the refrigerator 1 having another structure.

As illustrated in the drawing, the refrigerator 1 according to the seventh embodiment of the present discloses may form an appearance by a cabinet 10 forming a refrigerating chamber 12 and a freezing chamber 13, a refrigerating chamber door 20 that opens and closes the refrigerating chamber 12 and the freezing chamber 13, and a freezing chamber door 30.

The refrigerating chamber door 20 may be provided in one pair and may be rotatably mounted on the cabinet 10 to open and close the refrigerating chamber 12. A transparent panel assembly 60 may be provided on the right refrigerating chamber door 20 among the pair of refrigerating chamber doors 20. The transparent panel assembly 60 may form an outer appearance of a part of the front surface of the refrigerating chamber door 20. In addition, the transparent panel assembly 60 is configured to selectively see through the storage space from the outside to the inside of the refrigerator. The transparent panel assembly 60 may have the same structure as the transparent panel assemblies 60 of the above-described embodiments.

A door light (not illustrated) may be provided on the rear surface of the refrigerating chamber door 20. When the door light 54 is turned on/off, the transparent panel assembly 60 is selectively transparent such that the inside of the refrigerator can be seen through.

The embodiments of the present disclosure have high industrial applicability since it is expected that the processability and productivity will be improved and the manufacturing costs will be reduced.

The invention claimed is:

1. A method for manufacturing a transparent panel assembly configured to be disposed on a door of a refrigerator and to allow a rear space of the door to be visible from an outside of the door, the transparent panel assembly including a plurality of transparent panels spaced apart from one another in a front-rear direction of the refrigerator, the method comprising:
   providing a front panel and a rear panel that are made of a transparent material and that define a front surface and a rear surface of the transparent panel assembly, respectively;
   injection-molding an intermediate member with a transparent plastic material; and
   placing the intermediate member between the front panel and the rear panel to couple the front panel to the rear panel,
   wherein the intermediate member comprises:
      a partition portion that partitions a space between the front panel and the rear panel in the front-rear direction, and
      an edge portion that extends along a circumference of the partition portion, the edge portion having a front end attached to the front panel and a rear end attached to the rear panel.

2. The method according to claim 1, wherein at least one of the front panel or the rear panel is made of a glass material.

3. The method according to claim 1, wherein each of the intermediate member and the rear panel is injection-molded using a synthetic resin material.

4. The method according to claim 3, wherein the intermediate member is made of a poly methyl methacrylate (PMMA).

5. The method according to claim 1, further comprising:
   coupling the intermediate member to the front panel and the rear panel to thereby define a front insulation layer at a front side of the partition portion and a rear insulation layer at a rear side of the partition portion.

6. The method according to claim 5, further comprising:
   providing an insulation gas to each of the front insulation layer and the rear insulation layer.

7. The method according to claim 5, wherein injection-molding the intermediate member comprises providing a mold that defines a mounting protrusion on each of a front surface of the partition portion and a rear surface of the partition portion, and
   wherein the method further comprises inserting a moisture absorbent case into the mounting protrusion, the moisture absorbent case including a moisture absorbent configured to be disposed inside each of the front insulating layer and the rear insulating layer.

8. The method according to claim 7, wherein the front panel includes an opaque screening area that is disposed at a circumference of the front panel, the opaque screening area covering front sides of the edge portion of the intermediate member and the moisture absorbent case.

9. The method according to claim 1, wherein the front panel extends laterally farther than the rear panel, and
   wherein placing the intermediate member comprises placing a front end of the edge portion of the intermediate member at a position laterally inward relative to an outer end of the front panel.

10. The method according to claim 9, wherein the intermediate member comprises a front adhesive portion that extends laterally outward from the front end of the edge portion and is configured to be in contact with a rear surface of the front panel, the front adhesive portion defining an adhesive groove that is recessed away from the rear surface of the front panel, and
    wherein the method further comprises providing an adhesive to the adhesive groove of the front adhesive portion.

11. The method according to claim 10, wherein the adhesive comprises an ultraviolet (UV) adhesive, and
    wherein the method further comprises irradiating infrared light to the UV adhesive to thereby attach the front panel to the intermediate member.

12. The method according to claim 1, wherein the edge portion of the intermediate member comprises a stepped portion that is disposed at a rear end of the edge portion and configured to support a circumference of the rear panel, and
    wherein the method further comprises attaching the rear panel to the stepped portion that supports the circumference of the rear panel.

13. The method according to claim 12, wherein the stepped portion includes an inclined portion that is spaced apart from a lateral end surface of the rear panel and inclined away from the lateral end surface of the rear panel, and
    wherein the method further comprises providing an adhesive to a space between the inclined portion and the lateral end surface of the rear panel to thereby attach the rear panel to the stepped portion.

14. The method according to claim 13, wherein the adhesive comprises an ultraviolet (UV) adhesive, and
    wherein the method further comprises irradiating infrared light to the UV adhesive to thereby attach the rear panel to the intermediate member.

15. The method according to claim 12, wherein attaching the rear panel to the stepped portion comprises applying ultrasonic vibration to at least one of the rear panel or the stepped portion.

16. The method according to claim 15, further comprising:
    machining a surface of the stepped portion to thereby define a concave-convex portion on the stepped portion.

17. The method according to claim 1, wherein the edge portion of the intermediate member comprises a stepped portion that is disposed at a front end of the edge portion and configured to support a circumference of the front panel, and
    wherein the method further comprises attaching the front panel to the stepped portion that supports the circumference of the front panel.

18. The method according to claim 17, wherein the stepped portion includes an inclined portion that is spaced apart from a lateral end surface of the front panel and inclined away from the lateral end surface of the front panel, and
    wherein the method further comprises providing an adhesive to a space between the inclined portion and the lateral end surface of the front panel to thereby attach the front panel to the stepped portion.

19. The method according to claim 1, further comprising: providing an insulation coating layer on a surface of the partition portion for radiant insulation.

20. The method according to claim 1, wherein the partition portion comprises a plurality of partitions that are spaced apart from one another in the front-rear direction, and wherein injection-molding the intermediate member comprises providing a mold that defines the edge portion connecting outer ends of the plurality of partitions to one another.

\* \* \* \* \*